United States Patent
Mori et al.

(10) Patent No.: US 10,567,081 B2
(45) Date of Patent: Feb. 18, 2020

(54) TRANSMISSION SYSTEM AND TRANSMISSION METHOD

(71) Applicant: FUJITSU LIMITED, Kawasaki-shi, Kanagawa (JP)

(72) Inventors: Shota Mori, Yokohama (JP); Tooru Matsumoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/149,169

(22) Filed: Oct. 2, 2018

(65) Prior Publication Data

US 2019/0115993 A1 Apr. 18, 2019

(30) Foreign Application Priority Data

Oct. 13, 2017 (JP) .................. 2017-199542

(51) Int. Cl.
*H04B 10/2525* (2013.01)
*H04J 14/02* (2006.01)

(52) U.S. Cl.
CPC .... *H04B 10/25253* (2013.01); *H04J 14/0278* (2013.01)

(58) Field of Classification Search
CPC ....................... H04J 14/0278; H04B 10/25253
See application file for complete search history.

(56) References Cited

U.S. PATENT DOCUMENTS

| | | | | |
|---|---|---|---|---|
| 6,115,173 A | * | 9/2000 | Tanaka | H04B 10/2935 359/333 |
| 6,509,987 B1 | * | 1/2003 | Hunziker | H04B 10/291 398/157 |
| 7,254,341 B2 | * | 8/2007 | Islam | H04B 10/25133 398/140 |
| 7,565,083 B1 | * | 7/2009 | Akasaka | H04B 10/2507 398/140 |
| 2005/0099674 A1 | | 5/2005 | Watanabe | |
| 2010/0329686 A1 | * | 12/2010 | Frankel | H04B 10/25253 398/83 |
| 2014/0029951 A1 | * | 1/2014 | Handelman | H04J 14/02 398/91 |

FOREIGN PATENT DOCUMENTS

| | | |
|---|---|---|
| EP | 1008898 | 6/2000 |
| JP | 2000-075330 | 3/2000 |
| JP | 2000-081643 | 3/2000 |
| JP | 2001-274750 | 10/2001 |
| JP | 2003-188830 | 7/2003 |

* cited by examiner

*Primary Examiner* — Casey L Kretzer
(74) *Attorney, Agent, or Firm* — Fujitsu Patent Center

(57) ABSTRACT

A transmission system includes a plurality of nodes in which respective adjacent nodes are coupled by a first kind of optical fiber compatible with light in a first wavelength band or a second kind of optical fiber compatible with light in a second wavelength band, wherein each of the plurality of nodes includes a transmitting node that generates a wavelength-multiplexed optical signal in the first wavelength band by carrying out wavelength multiplexing of a plurality of optical signals and transmits the wavelength-multiplexed optical signal, a receiving node that demultiplexes the plurality of optical signals from the wavelength-multiplexed optical signal and receives the plurality of optical signals, and one or more relay nodes that relay the wavelength-multiplexed optical signal from the transmitting node to the receiving node through the first kind or the second kind of optical fiber.

16 Claims, 19 Drawing Sheets

FIG. 6

| C-BAND CHANNEL NUMBER | USE INFORMATION | FAILURE INFORMATION | L-BAND CHANNEL NUMBER |
|---|---|---|---|
| #1 | IN USE | NORMAL | #88 |
| #2 | IN USE | SIGNAL DISCONNECTION | #87 |
| #3 | UNUSED | SIGNAL DISCONNECTION | #86 |
| #4 | UNUSED | SIGNAL DISCONNECTION | #85 |
| ... | ... | ... | ... |
| #87 | IN USE | NORMAL | #2 |
| #88 | UNUSED | SIGNAL DISCONNECTION | #1 |

TRANSMISSION SYSTEM AND TRANSMISSION METHOD

CROSS-REFERENCE TO RELATED APPLICATION

This application is based upon and claims the benefit of priority of the prior Japanese Patent Application No. 2017-199542, filed on Oct. 13, 2017, the entire contents of which are incorporated herein by reference.

FIELD

The embodiments discussed herein are related to a transmission system and a transmission method.

BACKGROUND

As optical fibers that transmit optical signals, single mode fiber (SMF) and dispersion shifted fiber (DSF) are cited, for example. For example, in Japan, a transmission line is not necessarily composed only of the SMF and possibly includes the DSF partly.

The DSF is designed in such a manner that the chromatic dispersion becomes zero. However, when a wavelength-multiplexed optical signal in the C-band (1.55 (nm) band) is transmitted to the DSF, signal distortion is caused due to the non-linear optical effect and the signal quality deteriorates. In contrast, in the SMF, the influence of the non-linear optical effect is small with a wavelength-multiplexed optical signal in either of the C-band and the L-band (1.59 (nm) band). Regarding the C-band and the L-band, there is a method in which the wavelength band of wavelength-multiplexed optical signals is converted between the C-band and the L-band.

For example when only a halfway section of a transmission path of wavelength-multiplexed optical signals is the DSF and the other sections are the SMF, the non-linear optical effect is suppressed if the power of the wavelength-multiplexed optical signal input to the DSF is sufficiently attenuated by an optical attenuator or the like. However, the power for reception of the wavelength-multiplexed optical signal is insufficient and therefore the transmission becomes difficult or sufficient transmission distance is not obtained. For this reason, in the above-described transmission path, optical transmission equipment compatible with the L-band is set at each node and wavelength-multiplexed optical signals in the L-band are transmitted.

For example, if a transmission path of wavelength-multiplexed optical signals is switched from the SMF to the DSF halfway, the deterioration of the signal quality is suppressed by converting the wavelength band of wavelength-multiplexed optical signals from the C-band to the L-band. In this case, in the section of the DSF, optical transmission equipment compatible with the L-band is set at each node and wavelength-multiplexed optical signals in the L-band are transmitted.

However, the optical transmission equipment compatible with the L-band has a small market size and therefore is expensive compared with optical transmission equipment compatible with the C-band. For example, a transponder that transmits and receives optical signals that are wavelength-multiplexed into a wavelength-multiplexed optical signal is set for each communication line and therefore the ratio of the configuration in the whole transmission system is high. Therefore, for example, when the number of transponders compatible with the L-band increases, the apparatus cost of the whole transmission system increases.

The following is a reference document.
[Document 1] Japanese Laid-open Patent Publication No. 2001-274750.

SUMMARY

According to an aspect of the embodiments, a transmission system includes a plurality of nodes in which respective adjacent nodes are coupled by a first kind of optical fiber compatible with light in a first wavelength band or a second kind of optical fiber compatible with light in a second wavelength band, wherein each of the plurality of nodes includes a transmitting node that generates a wavelength-multiplexed optical signal in the first wavelength band by carrying out wavelength multiplexing of a plurality of optical signals and transmits the wavelength-multiplexed optical signal, a receiving node that demultiplexes the plurality of optical signals from the wavelength-multiplexed optical signal and receives the plurality of optical signals, and one or more relay nodes that relay the wavelength-multiplexed optical signal from the transmitting node to the receiving node through the first kind or the second kind of optical fiber, wherein a first node coupled to an adjacent node on a downstream side by the second kind of optical fiber on a most upstream side on a relay path of the wavelength-multiplexed optical signal in the plurality of nodes includes a first wavelength converting circuit that converts a wavelength band of the wavelength-multiplexed optical signal from the first wavelength band to the second wavelength band, and wherein a second node coupled to an adjacent node on an upstream side by the second kind of optical fiber on a most downstream side on the relay path of the wavelength-multiplexed optical signal in the plurality of nodes includes a second wavelength converting circuit that converts the wavelength band of the wavelength-multiplexed optical signal from the second wavelength band to the first wavelength band.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram illustrating one example of conversion of management information of wavelength-multiplexed optical signals;

DESCRIPTION OF EMBODIMENTS

First Comparative Example

Figure 1:
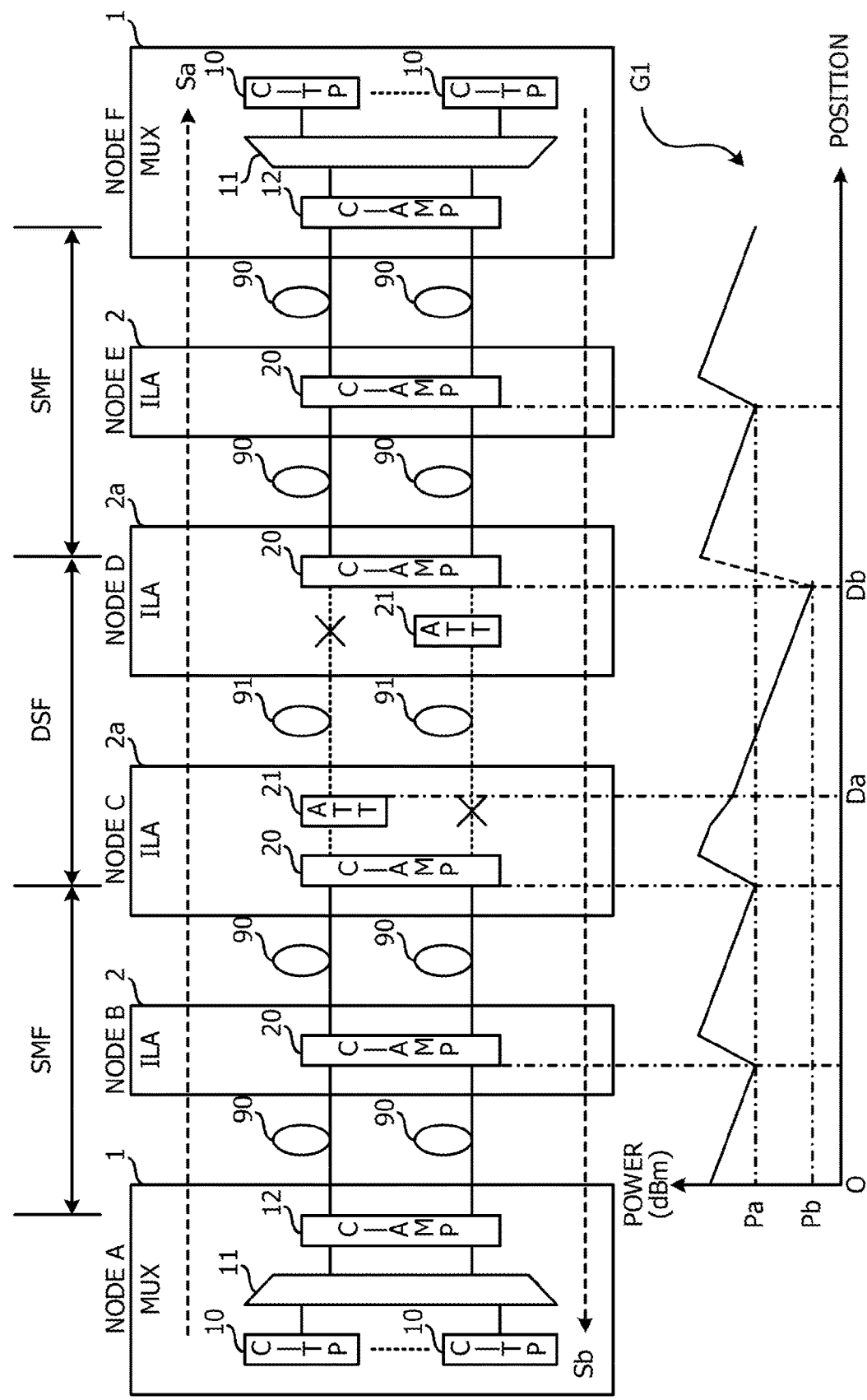
FIG. 1 is a configuration diagram illustrating a transmission system of a first comparative example.

FIG. 1 is a configuration diagram illustrating a transmission system of a first comparative example. The transmission system includes nodes A to F coupled in series as one example. In the present example, the case in which only a halfway section of a transmission path of wavelength-multiplexed optical signals Sa and Sb is DSFs 91 and the other sections are SMFs 90 is cited. The nodes A to C and the nodes D to F adjacent to each other are coupled by a pair of SMFs 90 and the nodes C and D adjacent to each other are coupled by a pair of DSFs 91.

As above, for the nodes A to F of the transmission system, the respective adjacent nodes are coupled by the SMFs 90 or the DSFs 91. The SMF 90 is one example of the first kind of optical fiber and the DSF 91 is one example of the second kind of optical fiber. In this and subsequent drawings, the SMFs 90 are represented by solid lines and the DSFs 91 are represented by dashed lines.

Pieces of optical multiplexing/demultiplexing apparatus (MUX) 1 are set at the nodes A and F of the end parts and in-line amplifiers (ILA) 2 and 2a are set at the other nodes B to E. The multiplexing/demultiplexing apparatus 1 of the node A transmits a wavelength-multiplexed optical signal Sa in the C-band to the multiplexing/demultiplexing apparatus 1 of the node F through the nodes B to E, and the multiplexing/demultiplexing apparatus 1 of the node F transmits a wavelength-multiplexed optical signal Sb in the C-band to the multiplexing/demultiplexing apparatus 1 of the node A through the nodes B to E.

The multiplexing/demultiplexing apparatus 1 includes plural transponders (C-TP) 10, a multiplexing/demultiplexing unit 11, and an amplifying unit (C-AMP) 12 that are each compatible with the C-band. The plural transponders 10 transmit and receive optical signals different in the wavelength. The transponder 10 is composed of a laser diode that generates an optical signal, an optical modulator that modulates light, a photodetector that converts an optical signal to an electrical signal, and so forth.

The multiplexing/demultiplexing unit 11 generates the wavelength-multiplexed optical signal Sa or Sb by carrying out wavelength multiplexing of optical signals transmitted from the respective transponders 10 and outputs the wavelength-multiplexed optical signal Sa or Sb to the amplifying unit 12. Furthermore, the multiplexing/demultiplexing unit 11 demultiplexes the wavelength-multiplexed optical signal Sa or Sb input from the amplifying unit 12 into optical signals of each wavelength and outputs the optical signals to the transponders 10. The multiplexing/demultiplexing unit 11 includes an arrayed waveguide grating (AWG) or the like.

The amplifying unit 12 amplifies the wavelength-multiplexed optical signal Sa or Sb input from the SMF 90 and outputs the wavelength-multiplexed optical signal Sa or Sb to the multiplexing/demultiplexing unit 11. Furthermore, the amplifying unit 12 amplifies the wavelength-multiplexed optical signal Sa or Sb input from the multiplexing/demultiplexing unit 11 and outputs the wavelength-multiplexed optical signal Sa or Sb to the SMF 90. The amplifying unit 12 includes an erbium-doped optical fiber amplifier (EDFA) or the like.

As above, the nodes A and F each generate and transmit the wavelength-multiplexed optical signal Sa or Sb in the C-band by carrying out wavelength multiplexing of plural optical signals as one example of the transmitting node. Furthermore, the nodes A and F each demultiplex and receive plural optical signals from the wavelength-multiplexed optical signal Sa or Sb as one example of the receiving node. The wavelength-multiplexed optical signal Sa is transmitted through one of the pair of SMFs 90 and one of the pair of DSFs 91 and the wavelength-multiplexed optical signal Sb is transmitted through the other of the pair of SMFs 90 and the other of the pair of DSFs 91.

The other nodes B to E relay the wavelength-multiplexed optical signal Sa or Sb from the transmitting node A or F to the receiving node F or A through the SMF 90 or the DSF 91 as one example of the relay nodes. The in-line amplifiers 2 and 2a of the nodes B to E amplify the wavelength-multiplexed optical signals Sa and Sb by amplifying units (C-AMP) 20 compatible with the C-band. The amplifying unit 20 includes an EDFA or the like.

The SMF 90 is compatible with light in the C-band and light in the L-band and the DSF 91 is compatible with light in the L-band. For example, the SMF 90 is capable of normal optical transmission of the C-band and the L-band in transmission characteristics thereof and the DSF 91 is capable of normal optical transmission of the L-band in transmission characteristics thereof. Conversely, the DSF 91 is incompatible with light in the C-band and has difficulty in normal optical transmission as described later. Here, the C-band is one example of the first wavelength band and refers to a wavelength band of 1528 to 1563 (nm), and the L-band is one example of the second wavelength band and refers to a wavelength band of 1570 to 1607 (nm).

Because being light in the C-band, the wavelength-multiplexed optical signals Sa and Sb are normally transmitted in the section of the SMFs 90. However, in the sections of the DSFs 91, signal distortion is caused due to the non-linear optical effect and the signal quality deteriorates. For this reason, at the nodes C and D coupled by the DSFs 91, optical attenuators (ATT) 21 are set in the in-line amplifiers 2a.

The optical attenuator 21 attenuates the wavelength-multiplexed optical signal Sa or Sb input to the DSF 91 and thus the non-linear optical effect is suppressed. However, due to the attenuation, the power for reception of the wavelength-multiplexed optical signal Sa or Sb is insufficient and therefore there is a possibility that the transmission becomes difficult or sufficient transmission distance is not obtained.

Symbol G1 represents one example of change in the power (dBm) according to the position regarding the wavelength-multiplexed optical signal Sa transmitted from the node A to the node F. The power of the wavelength-multiplexed optical signal Sa increases due to each amplifying unit 20 and decreases every time the wavelength-multiplexed optical signal Sa passes through the SMF 90 or the DSF 91.

The in-line amplifier 2a of the node C attenuates the wavelength-multiplexed optical signal Sa by the optical attenuator 21 and thus the power thereof decreases after the passing through the optical attenuator 21 (see symbol Da). For this reason, power Pb (see symbol Db) of the wavelength-multiplexed optical signal Sa input to the in-line amplifier 2 of the node D is lower than power Pa when the wavelength-multiplexed optical signal Sa is input to the node B or C and there is a possibility that the wavelength-multiplexed optical signal Sa is not sufficiently amplified by the amplifying unit 20 of the node D (see dotted line). This also applies to the wavelength-multiplexed optical signal Sb in the opposite direction.

As above, there is a possibility that transmission becomes difficult or sufficient transmission distance is not obtained if only a halfway section of the transmission path of the wavelength-multiplexed optical signals Sa and Sb is the DSFs 91 and the other sections are the SMFs 90. For this reason, optical transmission equipment compatible with the L-band is set at each node and wavelength-multiplexed optical signals in the L-band are transmitted.

Second Comparative Example

Figure 2:
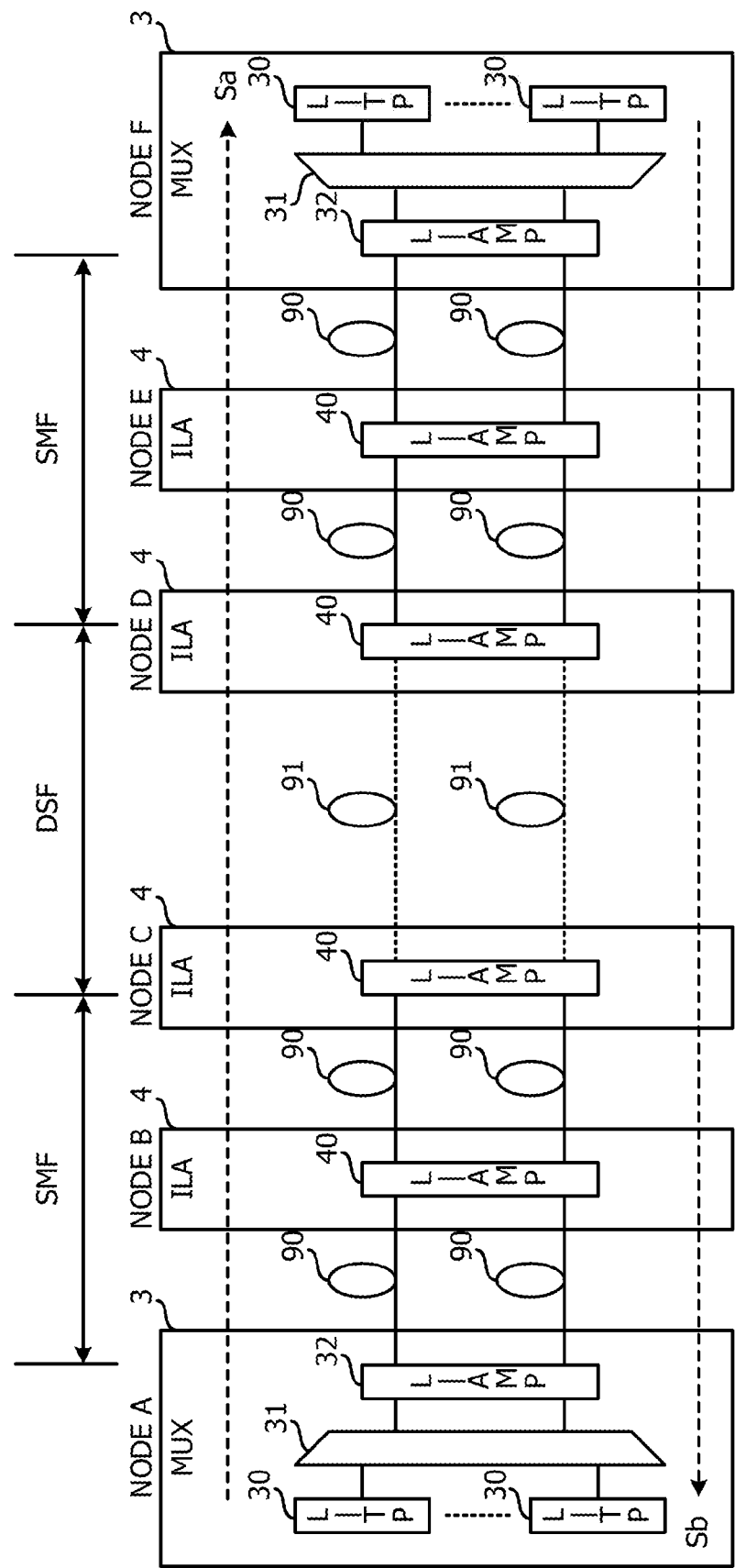
FIG. 2 is a configuration diagram illustrating a transmission system of a second comparative example.

FIG. 2 is a configuration diagram illustrating a transmission system of a second comparative example. In FIG. 2, a configuration common to FIG. 1 is given the same numeral and description thereof is omitted.

The transmission system of the present example includes nodes A to F and the arrangement of the SMFs 90 and the DSFs 91 forming the transmission path are similar to the first comparative example. Furthermore, pieces of optical transmission equipment in the L-band are set at the nodes A to F.

Multiplexing/demultiplexing apparatus 3 of the nodes A and F includes plural transponders (L-TP) 30, a multiplexing/demultiplexing unit 31, and an amplifying unit 32 that are each compatible with the L-band. Functions of the transponder 30, the multiplexing/demultiplexing unit 31, and the amplifying unit 32 are similar to the above-described transponder 10, multiplexing/demultiplexing unit 11, and amplifying unit 12, respectively, excluding the corresponding wavelength band.

Furthermore, in-line amplifiers 4 of the nodes B to E amplify the wavelength-multiplexed optical signals Sa and Sb by amplifying units (L-AMP) 40 compatible with the L-band. Functions of the amplifying unit 40 are similar to the above-described amplifying units 20 excluding the corresponding wavelength band.

The wavelength band of the wavelength-multiplexed optical signals Sa and Sb is the L-band and the SMF 90 and the DSF 91 are compatible with light in the L-band in transmission characteristics thereof. Thus, the wavelength-multiplexed optical signals Sa and Sb are normally transmitted between the nodes A and F.

Third Comparative Example

Figure 3:
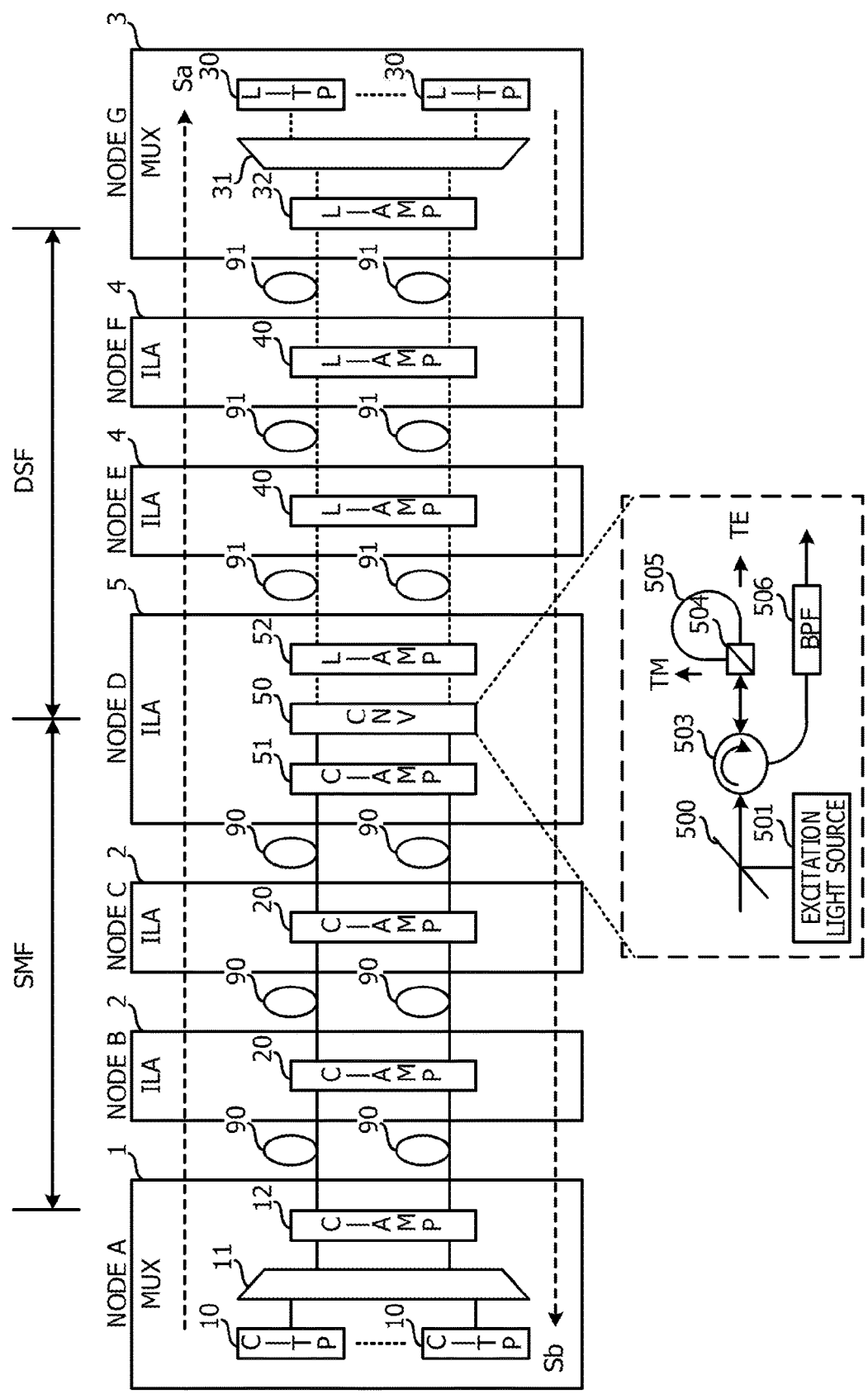
FIG. 3 is a configuration diagram illustrating a transmission system of a third comparative example.

FIG. 3 is a configuration diagram illustrating a transmission system of a third comparative example. In FIG. 3, a configuration common to FIG. 1 and FIG. 2 is given the same numeral and description thereof is omitted.

The transmission system includes nodes A to G coupled in series as one example. In the present example, the case in which a transmission path of the wavelength-multiplexed optical signals Sa and Sb is switched from the SMFs 90 to the DSFs 91 halfway is cited. The nodes A to D adjacent to each other are coupled by a pair of SMFs 90 and the nodes D to G adjacent to each other are coupled by a pair of DSFs 91.

The nodes A and G are transmitting node and receiving node and pieces of multiplexing/demultiplexing apparatus 1 and 3 are set. The other nodes B to F are relay nodes and in-line amplifiers 2, 4, and 5 are set.

The in-line amplifier 5 of the node D existing at the boundary between the sections of the SMFs 90 and the DSFs 91 is equipped with a function of converting the wavelength band of the wavelength-multiplexed optical signals Sa and Sb. The in-line amplifier 5 includes a wavelength converter 50 that converts the wavelength band, an amplifying unit 51 compatible with the C-band, and an amplifying unit 52 compatible with the L-band.

The amplifying unit 51 amplifies the wavelength-multiplexed optical signal Sa in the C-band input from the node C through the SMF 90 and outputs the wavelength-multiplexed optical signal Sa to the wavelength converter 50. Furthermore, the amplifying unit 51 amplifies the wavelength-multiplexed optical signal Sb in the C-band input from the wavelength converter 50 and outputs the wavelength-multiplexed optical signal Sb to the node C through the SMF 90.

The amplifying unit 52 amplifies the wavelength-multiplexed optical signal Sb in the L-band input from the node E through the DSF 91 and outputs the wavelength-multiplexed optical signal Sb to the wavelength converter 50. Furthermore, the amplifying unit 52 amplifies the wavelength-multiplexed optical signal Sa in the L-band input from the wavelength converter 50 and outputs the wavelength-multiplexed optical signal Sa to the node E through the DSF 91.

The wavelength converter 50 converts the wavelength band of the wavelength-multiplexed optical signal Sa input from the amplifying unit 51 from the C-band to the L-band and outputs the wavelength-multiplexed optical signal Sa to the amplifying unit 52. Furthermore, the wavelength converter 50 converts the wavelength band of the wavelength-multiplexed optical signal Sb input from the amplifying unit 52 from the L-band to the C-band and outputs the wavelength-multiplexed optical signal Sb to the amplifying unit 51.

In FIG. 3, a configuration for converting the wavelength band from the L-band to the C-band or from the C-band to the L-band is illustrated. The wavelength converter 50 includes a wavelength division multiplexing (WDM) coupler 500, an excitation light source 501, an optical circulator 503, a polarization beam splitter 504, a highly non-linear fiber (HNLF) 505, and a band-pass filter (BPF) 506.

The wavelength-multiplexed optical signal Sa or Sb is multiplexed with excitation light from the excitation light source 501 by the WDM coupler 500. The excitation light source 501 is a laser diode, for example, and functions as a pump light source. The wavelength of the excitation light is a single wavelength and is 1567 (nm), for example.

The multiplexed light of the excitation light and the wavelength-multiplexed optical signal Sa or Sb is input from the optical circulator 503 to the polarization beam splitter 504. Both ends of the highly non-linear fiber 505 are coupled to the polarization beam splitter 504. The multiplexed light is split into a transverse electric (TE) polarized wave and a transverse magnetic (TM) polarized wave by the polarization beam splitter 504, and each of the TE polarized wave and the TM polarized wave is input to a respective one of both ends of the highly non-linear fiber 505 and is input to the polarization beam splitter 504 again from the other end.

The highly non-linear fiber 505 includes two principal axes. The output port of the TE polarized wave of the polarization beam splitter 504 is coupled at an angle that matches one principal axis at one end of the highly non-linear fiber 505. The output port of the TM polarized wave of the polarization beam splitter 504 is coupled at an angle that matches the same principal axis at the other end of the highly non-linear fiber 505.

With the highly non-linear fiber 505, through optimization of the material and structure of the optical fiber, the four-wave mixing (FWM) effect is higher than with a normal optical fiber and it is possible to obtain high wavelength conversion efficiency even with a short length. To implement wavelength conversion in a wide bandwidth, it is desirable that the zero-dispersion wavelength of the highly non-linear fiber 505 correspond with the wavelength of the excitation light. Due to this, light in the wavelength band after conversion of the wavelength-multiplexed optical signal Sa or Sb (C-band or L-band) is generated.

The polarization beam splitter 504 carries out polarization combining of the TE polarized wave and the TM polarized wave that return from the highly non-linear fiber 505 and outputs the combined light to the optical circulator 503. The optical circulator 503 outputs the combined light of the TE polarized wave and the TM polarized wave to the band-pass filter 506.

The band-pass filter 506 includes an adequate transmission band and removes the wavelength-multiplexed optical signal Sa or Sb in the wavelength band before the conversion and the excitation light from the combined light. Thereby, the wavelength-multiplexed optical signal Sa or Sb whose wavelength band has been converted is output from the band-pass filter 506. The measure for wavelength conversion is not limited to the above and it is also possible to use a regenerative transponder that temporarily converts light in a wavelength band of one of the C-band and the L-band to an electrical signal and further converts the electrical signal to light in the other wavelength band.

As above, the in-line amplifier 5 of the node D converts the wavelength-multiplexed optical signal Sa or Sb from the C-band to the L-band or from the L-band to the C-band by the wavelength converter 50. Thus, the wavelength band of the wavelength-multiplexed optical signals Sa and Sb becomes the C-band in the section of the SMFs 90 and becomes the L-band in the section of the DSFs 91. Therefore, the wavelength-multiplexed optical signals Sa and Sb are normally transmitted between the nodes A and G with suppression of signal deterioration.

However, in the present example, the plural transponders 30 compatible with the L-band are used at the node G. Furthermore, in the second comparative example, the plural transponders 30 compatible with the L-band are used at the nodes A and F. For this reason, when the number of transponders 30 increases, the apparatus cost of the whole transmission system increases.

Therefore, in the following respective embodiments, a function of converting the wavelength band of the wavelength-multiplexed optical signals Sa and Sb is set at the respective nodes on the upstream side and the downstream side of a section of the DSFs 91. This allows transmitting node and receiving node to receive the wavelength-multiplexed optical signals Sa and Sb in the C-band. Due to this, the apparatus cost of the whole transmission system is reduced.

First Embodiment

Figure 4:
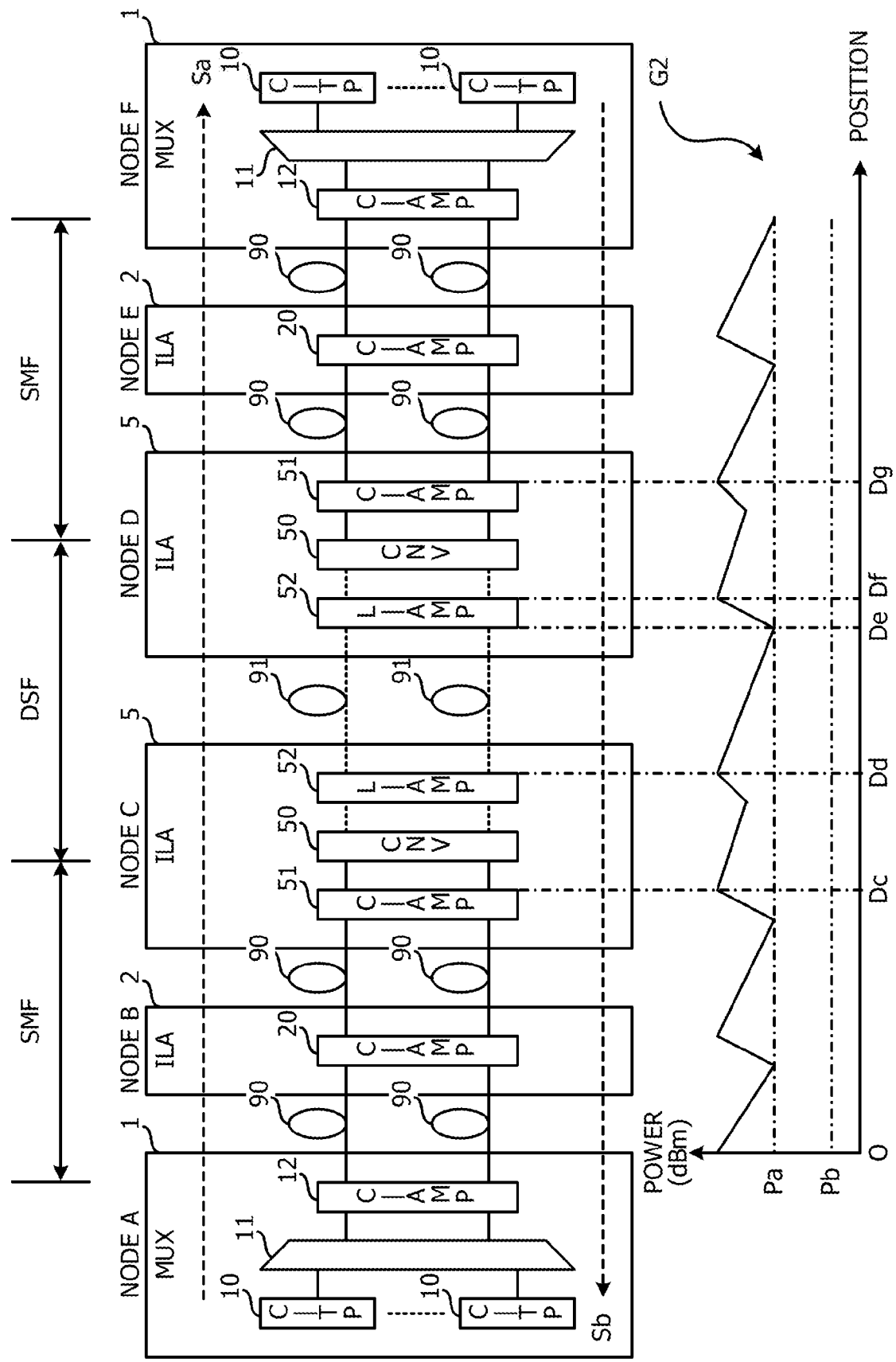
FIG. 4 is a configuration diagram illustrating a transmission system of a first embodiment.

FIG. 4 is a configuration diagram illustrating a transmission system of a first embodiment. In FIG. 4, a configuration common to FIG. 3 is given the same numeral and description thereof is omitted.

The transmission system includes nodes A to F coupled in series as one example. In the present example, the case in which only a halfway section of a transmission path of the wavelength-multiplexed optical signals Sa and Sb is the DSFs 91 and the other sections are the SMFs 90 is cited. The nodes A to C and the nodes D to F adjacent to each other are coupled by a pair of SMFs 90 and the nodes C and D adjacent to each other are coupled by a pair of DSFs 91.

The node A is the transmitting node of the wavelength-multiplexed optical signal Sa and the receiving node of the wavelength-multiplexed optical signal Sb. The node F is the receiving node of the wavelength-multiplexed optical signal Sa and the transmitting node of the wavelength-multiplexed optical signal Sb. The pieces of multiplexing/demultiplexing apparatus 1 are set at the nodes A and F.

Furthermore, the nodes B to E are relay nodes of the wavelength-multiplexed optical signals Sa and Sb. At the nodes B and E, the in-line amplifiers 2 including the amplifying unit 20 compatible with the C-band are set. Moreover, at the nodes C and D on the upstream side and the downstream side of the section of the DSFs 91, the in-line amplifiers 5 including the amplifying units 51 and 52 and the wavelength converter 50 are set.

For the wavelength-multiplexed optical signal Sa transmitted from the node A, the wavelength band is converted from the C-band to the L-band by the wavelength converter 50 of the node C. Thus, the wavelength-multiplexed optical signal Sa in the L-band is transmitted to the DSF 91 between the nodes C and D. The wavelength-multiplexed optical signal Sa in the L-band is input to the node D via the DSF 91 and the wavelength band is converted from the L-band to the C-band by the wavelength converter 50.

Thus, the wavelength-multiplexed optical signal Sa in the original C-band is input to the node F and therefore the transponders 10 of the C-band may be set at the node F instead of the L-band. Furthermore, also for the wavelength-multiplexed optical signal Sb in the opposite direction, the wavelength band is temporarily converted to the L-band at the node D and thereafter is converted to the C-band at the node C. Thus, the wavelength-multiplexed optical signal Sb in the original C-band is input to the node A and therefore the transponders 10 of the C-band may be set at the node A instead of the L-band.

Symbol G2 represents one example of change in the power (dBm) according to the position regarding the wavelength-multiplexed optical signal Sa transmitted from the node A to the node F. The power of the wavelength-multiplexed optical signal Sa increases due to the respective amplifying units 20, 51, and 52 and decreases every time the wavelength-multiplexed optical signal Sa passes through the SMF 90 or the DSF 91.

The nodes C and D do not need the optical attenuator 21 differently from the first comparative example and thus the power of the wavelength-multiplexed optical signal Sa input to the DSF 91 may be set to a higher value than the first comparative example (see symbol Dd). At this time, power loss due to the wavelength converter 50 of the node C is covered by the amount of amplification of the power by the amplifying unit 51 of the previous stage of the wavelength converter 50 and the amplifying unit 52 of the subsequent stage (see symbols Dc and Dd). For this reason, the power of the noise component is reduced.

Thus, power Pa of the wavelength-multiplexed optical signal Sa input to the amplifying unit 52 of the node D becomes sufficiently higher than the power Pb in the case of the first comparative example (see symbol De). Therefore, the amplifying unit 52 of the node D may sufficiently amplify the power of the wavelength-multiplexed optical signal Sa. Thus, differently from the first comparative example, there is neither a possibility that the transmission becomes difficult nor a possibility that sufficient transmission distance is not obtained. This also applies to the wavelength-multiplexed optical signal Sb in the opposite direction.

Furthermore, power loss due to the wavelength converter 50 of the node D is covered by the amount of amplification of the power by the amplifying unit 51 of the previous stage of the wavelength converter 50 and the amplifying unit 52 of the subsequent stage (see symbols Df and Dg). For this reason, the power of the noise component is reduced.

Figure 5:
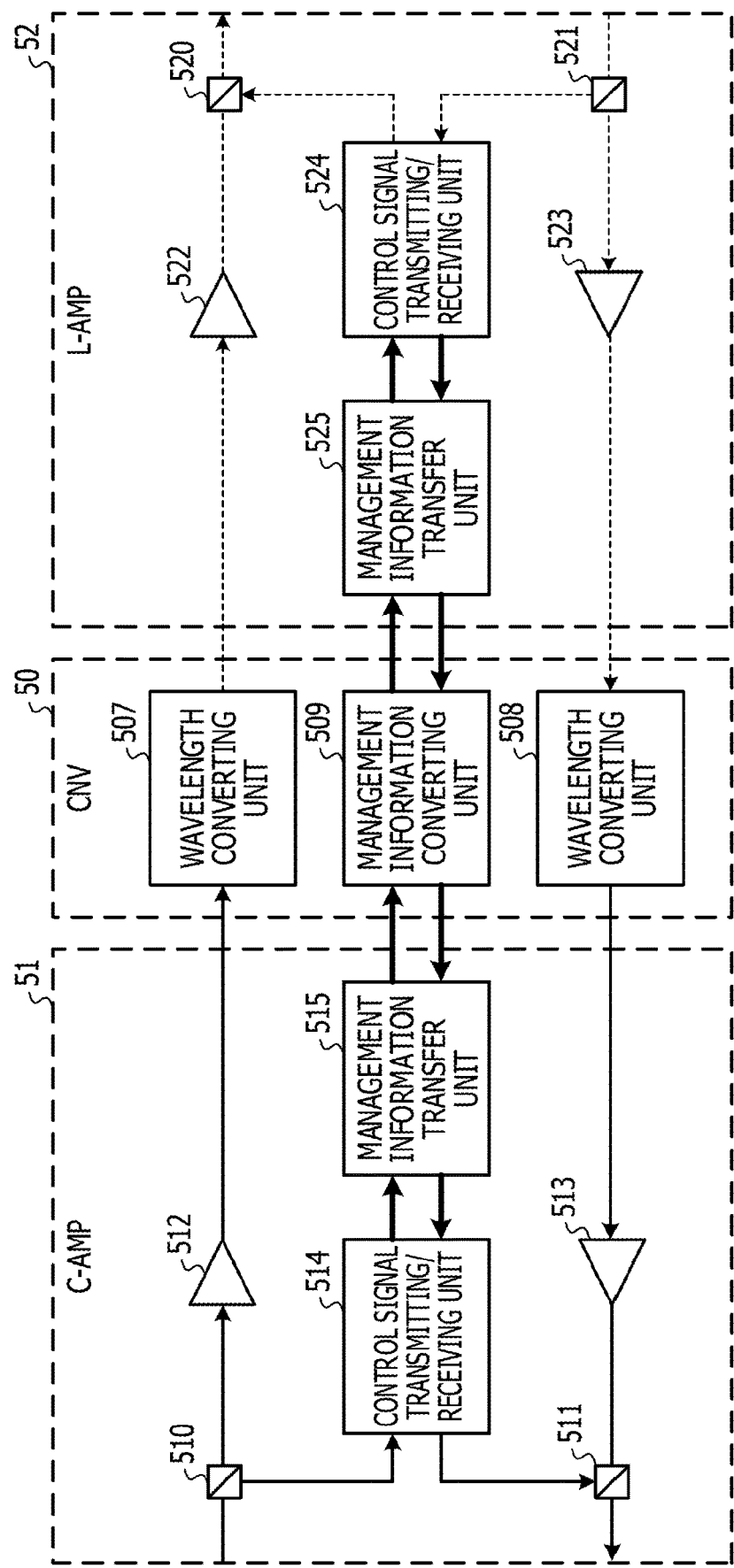
FIG. 5 is a configuration diagram illustrating one example of an in-line amplifier.

FIG. 5 is a configuration diagram illustrating one example of an in-line amplifier. The in-line amplifier in FIG. 5 may be the in-line amplifier 5 illustrated in FIG. 3. In FIG. 5, the paths of optical signals in the C-band are represented by solid lines and the paths of optical signals in the L-band are represented by dotted lines. Furthermore, thick solid lines represent the paths of electrical signals.

The in-line amplifier 5 includes the amplifying unit 51 compatible with the C-band, the wavelength converter 50, and the amplifying unit 52 compatible with the L-band. The amplifying unit 51 is one example of the first amplifying unit and the amplifying unit 52 is one example of the second amplifying unit.

The amplifying unit 51 includes WDM couplers 510 and 511, EDFAs 512 and 513, a control signal transmitting/receiving unit 514, and a management information transfer unit 515. The WDM coupler 510 demultiplexes an optical signal of a monitoring control channel from the wavelength-multiplexed optical signal Sa or Sb in the C-band and outputs the optical signal to the control signal transmitting/receiving unit 514. The wavelength-multiplexed optical signal Sa or Sb that has passed through the WDM coupler 510 is amplified by the EDFA 512 and is output to the wavelength converter 50.

The wavelength converter 50 includes wavelength converting units 507 and 508 and a management information converting unit 509. The wavelength converting unit 507 is one example of the first wavelength converting unit and converts the wavelength band of the wavelength-multiplexed optical signal Sa or Sb from the C-band to the L-band. The wavelength-multiplexed optical signal Sa or Sb in the L-band is input to the amplifying unit 52.

The amplifying unit 52 includes WDM couplers 520 and 521, EDFAs 522 and 523, a control signal transmitting/receiving unit 524, and a management information transfer unit 525. The EDFA 522 amplifies the wavelength-multiplexed optical signal Sa or Sb and outputs the wavelength-multiplexed optical signal Sa or Sb to the WDM coupler 520. The WDM coupler 520 multiplexes an optical signal of the monitoring control channel with the wavelength-multiplexed optical signal Sa or Sb and guides the multiplexed signal to the adjacent node.

The WDM coupler 521 demultiplexes an optical signal of the monitoring control channel from the wavelength-multiplexed optical signal Sa or Sb in the L-band and outputs the optical signal to the control signal transmitting/receiving unit 524. The wavelength-multiplexed optical signal Sa or Sb that has passed through the WDM coupler 521 is amplified by the EDFA 523 and is output to the wavelength converter 50.

The wavelength converting unit 508 is one example of the second wavelength converting unit and converts the wavelength band of the wavelength-multiplexed optical signal Sa or Sb from the L-band to the C-band. The wavelength-multiplexed optical signal Sa or Sb in the C-band is input to the amplifying unit 51. The respective wavelength converting units 507 and 508 include the similar configuration as the configuration of the wavelength converter 50 in FIG. 3, for example.

The EDFA 513 amplifies the wavelength-multiplexed optical signal Sa or Sb and outputs the wavelength-multiplexed optical signal Sa or Sb to the WDM coupler 511. The WDM coupler 511 multiplexes an optical signal of the monitoring control channel with the wavelength-multiplexed optical signal Sa or Sb and guides the multiplexed signal to the adjacent node.

The control signal transmitting/receiving unit 514 or 524 extracts management information of the wavelength-multiplexed optical signal Sa or Sb from the optical signal of the monitoring control channel demultiplexed from the wavelength-multiplexed optical signal Sa or Sb and transfers the management information to the control signal transmitting/receiving unit 524 or 514 through the management information transfer units 515 and 525. The control signal transmitting/receiving unit 524 or 514 generates an optical signal from the transferred management information and multiplexes the optical signal with the wavelength-multiplexed optical signal Sa or Sb by the WDM coupler 520 or 511.

The control signal transmitting/receiving units 514 and 524 are composed of laser diode, photodetector, field programmable gate array (FPGA), and so forth. Furthermore, the management information transfer units 515 and 525 and the management information converting unit 509 include an FPGA or the like.

The management information transfer units 515 and 525 output management information to the management information converting unit 509. The management information converting unit 509 converts the management information regarding each channel based on the correspondence relationship between channels of the C-band and channels of the L-band set in advance and outputs the management information to the management information transfer unit 515 or 525.

FIG. 6 is a diagram illustrating one example of conversion of management information of wavelength-multiplexed optical signals. The wavelength-multiplexed optical signals described with reference to FIG. 6 may be the wavelength-multiplexed optical signals Sa and Sb illustrated in FIG. 1. A C-band channel number is an identification number of the channel of the C-band and an L-band channel number is an identification number of the channel of the L-band. Furthermore, use information indicates whether the relevant channel is in use or unused. Failure information indicates the occurrence state of failure of an optical signal of the relevant channel.

The order of the C-band channel number and the order of the L-band channel number are opposite to each other. For example, C-band channel numbers #1 to #88 correspond to L-band channel numbers #88 to #1, respectively.

The management information converting unit 509 converts the channel number of the use information and the failure information between the C-band channel number and the L-band channel number mutually. For example if the use information "in use" and the failure information "signal disconnection" of C-band channel number #2 are extracted from an optical signal of the monitoring control channel of the C-band, the management information converting unit 509 converts C-band channel number #2 to L-band channel number #87.

Then, the management information converting unit 509 outputs the use information "in use" and the failure information "signal disconnection" of L-band channel number #87 to the management information transfer unit 525. This use information and failure information is multiplexed with the wavelength-multiplexed optical signal Sa or Sb in the L-band by the WDM coupler 520.

Due to this, on the node on the downstream side, for example, an alarm indication signal (AIS) is detected and the cause of failure is identified based on the use information "in use" and the failure information "signal disconnection" of L-band channel number #87.

As above, in the relay path of the wavelength-multiplexed optical signal Sa, the node C on the upstream side of the DSF 91 includes the wavelength converting unit 507 that converts the wavelength band of the wavelength-multiplexed optical signal Sa from the C-band to the L-band, and the node D on the downstream side of the DSF 91 includes the wavelength converting unit 508 that converts the wavelength band of the wavelength-multiplexed optical signal Sa from the L-band to the C-band. Here, the node C is one example of the first node coupled to the adjacent node D on the downstream side by the DSF 91 on the most upstream side on the relay path of the wavelength-multiplexed optical signal Sa. Furthermore, the node D is one example of the second node coupled to the adjacent node C on the upstream side by the DSF 91 on the most downstream side on the relay path of the wavelength-multiplexed optical signal Sa.

According to this configuration, the node C converts the wavelength band of the wavelength-multiplexed optical signal Sa from the transmitting node A from the C-band to the L-band and thus the wavelength-multiplexed optical signal Sa in the L-band is normally transmitted to the DSF 91. Furthermore, the node D converts the wavelength band of the wavelength-multiplexed optical signal Sa from the L-band to the C-band and thus the wavelength-multiplexed optical signal Sa in the C-band is input to the receiving node F. Therefore, the transponders 10 compatible with the C-band may be set at the transmitting node A and the receiving node F.

Furthermore, in the relay path of the wavelength-multiplexed optical signal Sb, the node D on the upstream side of the DSF 91 includes the wavelength converting unit 507 that converts the wavelength band of the wavelength-multiplexed optical signal Sb from the C-band to the L-band, and the node C on the downstream side of the DSF 91 includes the wavelength converting unit 508 that converts the wavelength band of the wavelength-multiplexed optical signal Sb from the L-band to the C-band. Here, the node D is one example of the first node coupled to the adjacent node C on the downstream side by the DSF 91 on the most upstream side on the relay path of the wavelength-multiplexed optical signal Sb. Furthermore, the node C is one example of the second node coupled to the adjacent node D on the upstream side by the DSF 91 on the most downstream side on the relay path of the wavelength-multiplexed optical signal Sb.

According to this configuration, similarly to the above, the transponders 10 compatible with the C-band may be set at the transmitting node F and the receiving node A.

Therefore, according to the present example, the apparatus cost of the whole transmission system is reduced.

Furthermore, the nodes C and D at which the wavelength converting units 507 and 508 are set are relay nodes. Therefore, the apparatus cost is reduced when only a halfway section of the transmission path is the DSFs 91 and the other sections are the SMFs 90 as in the present example.

Moreover, the nodes C and D each include the amplifying unit 51 that amplifies the wavelength-multiplexed optical signal Sa or Sb in the C-band and the amplifying unit 52 that amplifies the wavelength-multiplexed optical signal Sa or Sb in the L-band. For this reason, power loss of the wavelength-multiplexed optical signal Sa or Sb due to the wavelength converter 50 is covered by the amount of amplification of the power by the amplifying unit 51 and the amplifying unit 52.

Second Embodiment

Figure 7:
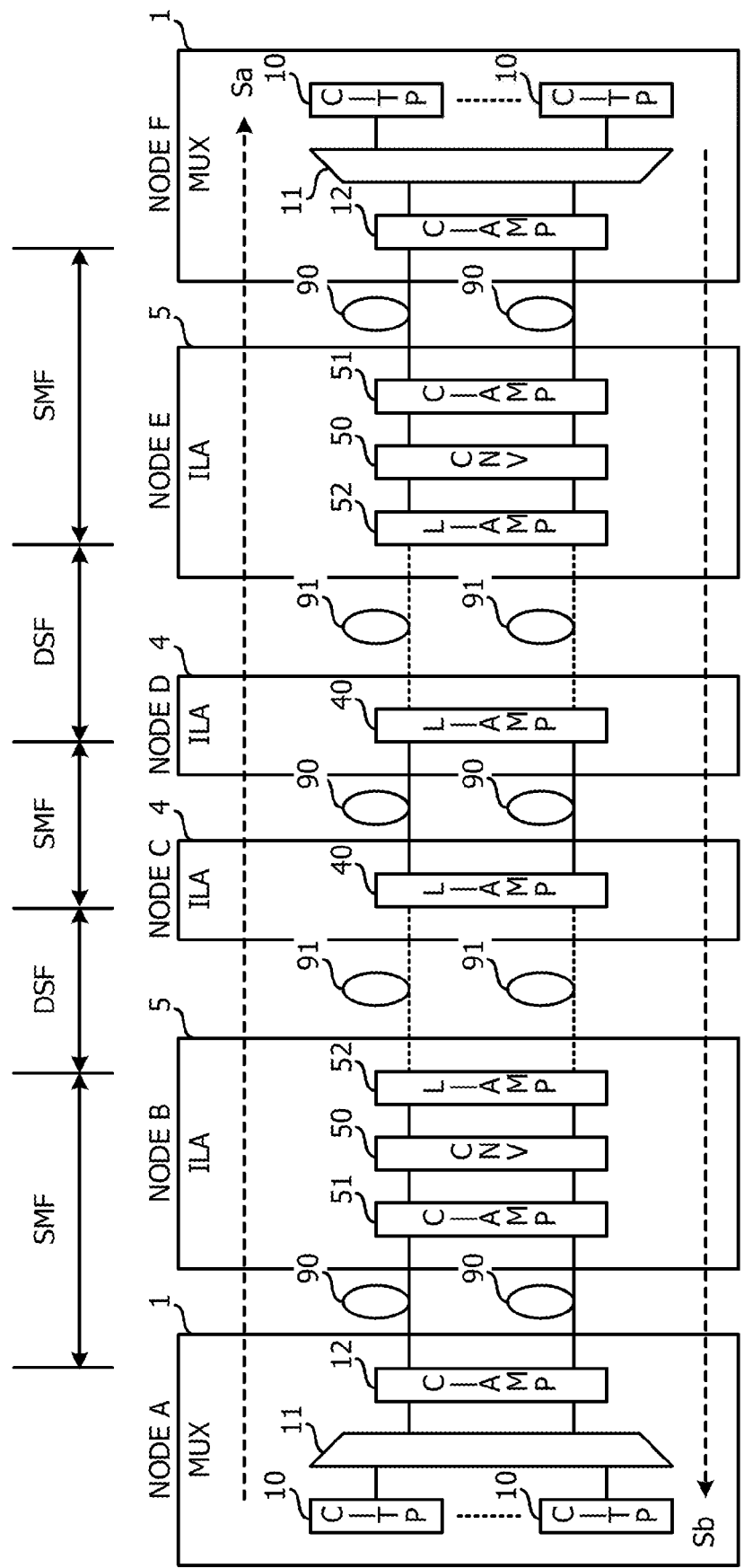
FIG. 7 is a configuration diagram illustrating a transmission system of a second embodiment.

FIG. 7 is a configuration diagram illustrating a transmission system of a second embodiment. In FIG. 7, a configuration common to FIG. 4 is given the same numeral and description thereof is omitted.

The transmission system includes nodes A to F coupled in series as one example. In the present example, the case in which a section of the SMFs 90 exists between sections of the DSFs 91 is cited. The nodes A and B, the nodes C and D, and the nodes E and F adjacent to each other are coupled by a pair of SMFs 90 and the nodes B and C and the nodes D and E adjacent to each other are coupled by a pair of DSFs 91.

The node A is the transmitting node of the wavelength-multiplexed optical signal Sa and the receiving node of the wavelength-multiplexed optical signal Sb. The node F is the receiving node of the wavelength-multiplexed optical signal Sa and the transmitting node of the wavelength-multiplexed optical signal Sb. The pieces of multiplexing/demultiplexing apparatus 1 are set at the nodes A and F.

Furthermore, the nodes B to E are relay nodes of the wavelength-multiplexed optical signals Sa and Sb. At the nodes C and D, the in-line amplifiers 4 including the amplifying unit 40 compatible with the L-band are set. Moreover, at the nodes B and E, the in-line amplifiers 5 including the amplifying units 51 and 52 and the wavelength converter 50 are set.

The node B is one example of the first node coupled to the adjacent node C on the downstream side by the DSF 91 on the most upstream side on the relay path of the wavelength-multiplexed optical signal Sa. Furthermore, the node E is one example of the second node coupled to the adjacent node D on the upstream side by the DSF 91 on the most downstream side on the relay path of the wavelength-multiplexed optical signal Sa.

The node A transmits the wavelength-multiplexed optical signal Sa in the C-band and the node B converts the wavelength band of the wavelength-multiplexed optical signal Sa from the C-band to the L-band. The wavelength-multiplexed optical signal Sa in the L-band is transmitted from the node C to the node D via the SMF 90. The SMF 90 is compatible with light in the L-band in addition to light in the C-band in transmission characteristics thereof and thus the wavelength-multiplexed optical signal Sa is normally transmitted between the nodes C and D.

Therefore, at the nodes C and D, the in-line amplifier 5 including the wavelength converter 50 does not need to be set and the normal in-line amplifiers 4 are set. For this reason, the lowering of transmission characteristics due to the wavelength converter 50 is suppressed and the apparatus cost is reduced.

Furthermore, the node E converts the wavelength band of the wavelength-multiplexed optical signal Sa from the L-band to the C-band and thus the wavelength-multiplexed optical signal Sa in the C-band is input to the node F. For this reason, the transponders 10 compatible with the C-band may be set at the node F. Moreover, the wavelength band of the wavelength-multiplexed optical signal Sb in the opposite direction is also converted to the C-band for the similar reason when being input to the node A. Therefore, the transponders 10 compatible with the C-band may be set at the node A.

As above, on the paths of the wavelength-multiplexed optical signals Sa and Sb, one set of relay nodes C and D that are coupled by the SMFs 90 and are adjacent to each other exist between the nodes B and E. Therefore, when a section of the SMFs 90 exists between sections of the DSFs 91, the wavelength-multiplexed optical signals Sa and Sb in the L-band are transmitted to the section of the SMFs 90 and therefore the excess wavelength converter 50 may be omitted and the apparatus cost is reduced.

Third Embodiment

Figure 8:
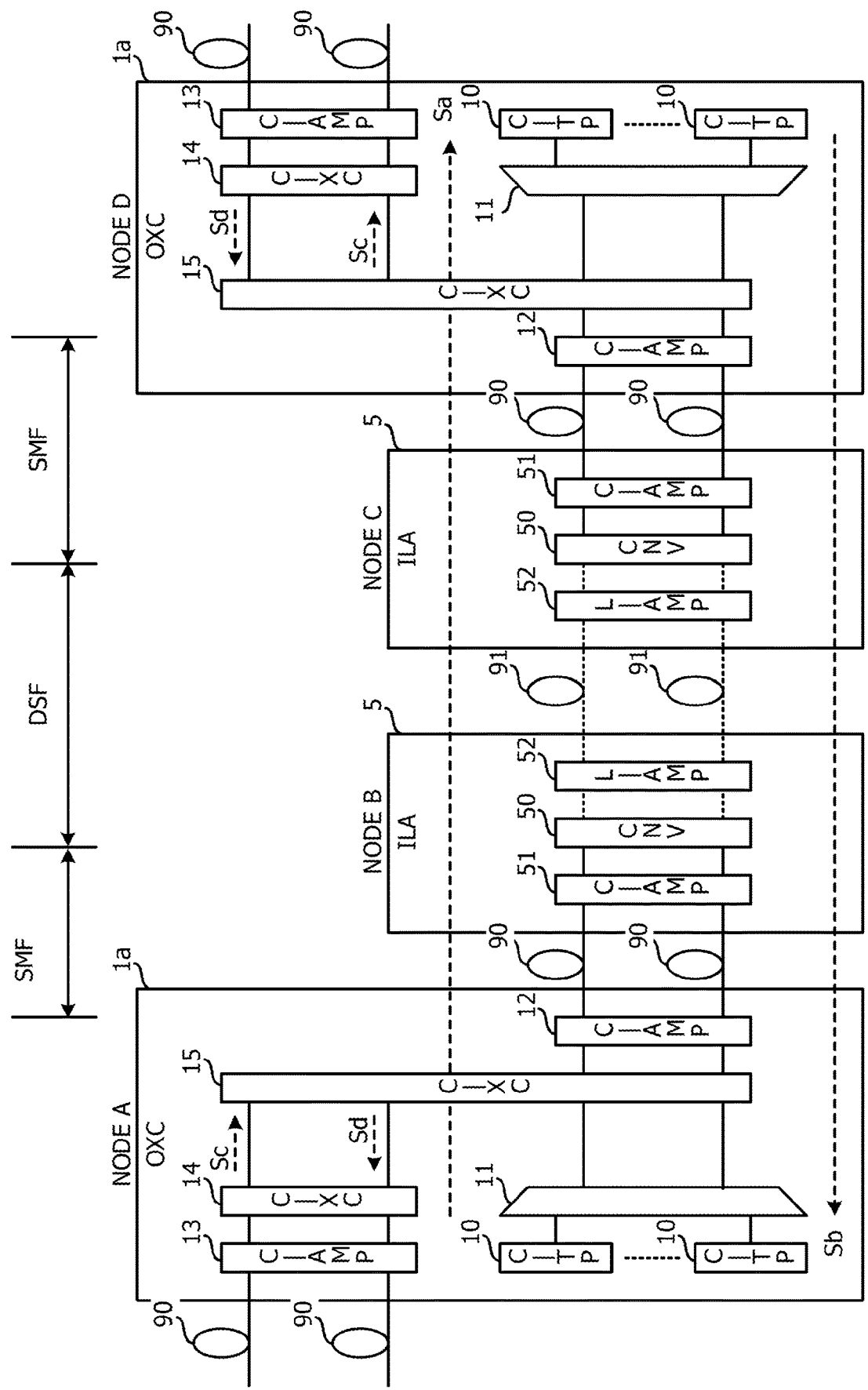
FIG. 8 is a configuration diagram illustrating a transmission system of a third embodiment.

FIG. 8 is a configuration diagram illustrating a transmission system of a third embodiment. In FIG. 8, a configuration common to FIG. 4 is given the same numeral and description thereof is omitted.

The transmission system includes nodes A to D coupled in series as one example. In the present example, at the nodes A and D that are transmitting node and receiving node, pieces of optical cross-connect apparatus (OXC) 1a are set instead of the multiplexing/demultiplexing apparatus 1. Furthermore, at the nodes B and C that are relay nodes, the in-line amplifiers 5 including the wavelength converter 50 are set.

The optical cross-connect apparatus 1a includes the transponders 10, the multiplexing/demultiplexing unit 11, amplifying units 12 and 13, and optical cross-connect units 14 and 15 that are each compatible with the C-band. The amplifying unit 13 and the optical cross-connect unit 14 are set corresponding to a route of an adjacent node different from the node B.

The amplifying unit 13 amplifies a wavelength-multiplexed optical signal in the C-band input from the SMF 90 of the route and outputs the wavelength-multiplexed optical signal to the optical cross-connect unit 14. The optical cross-connect unit 14 outputs the wavelength-multiplexed optical signal Sc or Sd input from the amplifying unit 13 to the optical cross-connect unit 15.

Furthermore, the optical cross-connect unit 14 outputs the wavelength-multiplexed optical signal Sc or Sd in the C-band input from the optical cross-connect unit 15 to the amplifying unit 13. The amplifying unit 13 amplifies the wavelength-multiplexed optical signal Sc or Sd and outputs the wavelength-multiplexed optical signal Sc or Sd to the SMF 90.

The optical cross-connect unit 15 demultiplexes the other wavelength-multiplexed optical signal Sc or Sd from the wavelength-multiplexed optical signal Sa or Sb and outputs the wavelength-multiplexed optical signal Sc or Sd to the optical cross-connect unit 14. Furthermore, the optical cross-connect unit 15 carries out wavelength multiplexing of the other wavelength-multiplexed optical signal Sc or Sd input from the optical cross-connect unit 14 with the wavelength-multiplexed optical signal Sa or Sb input from the multiplexing/demultiplexing unit 11. The wavelength-multiplexed optical signal Sa or Sb output from the optical cross-connect unit 15 is amplified by the amplifying unit 12 and is output to the SMF 90. The optical cross-connect units 14 and 15 are composed of wavelength selective switch, optical splitter, and so forth and the amplifying units 12 and 13 include an EDFA or the like.

For the wavelength-multiplexed optical signal Sa or Sb in the C-band transmitted from the node A or D, the wavelength band is temporarily converted to the L-band at the node B or C. Thereafter, the wavelength-multiplexed optical signal Sa or Sb passes through the DSF 91 and the wavelength band is converted to the C-band at the node C or B. Then, the wavelength-multiplexed optical signal Sa or Sb is received at the node D or A. Thus, also in the present example, the like effects as the above-described embodiments are obtained.

Fourth Embodiment

Figure 9:
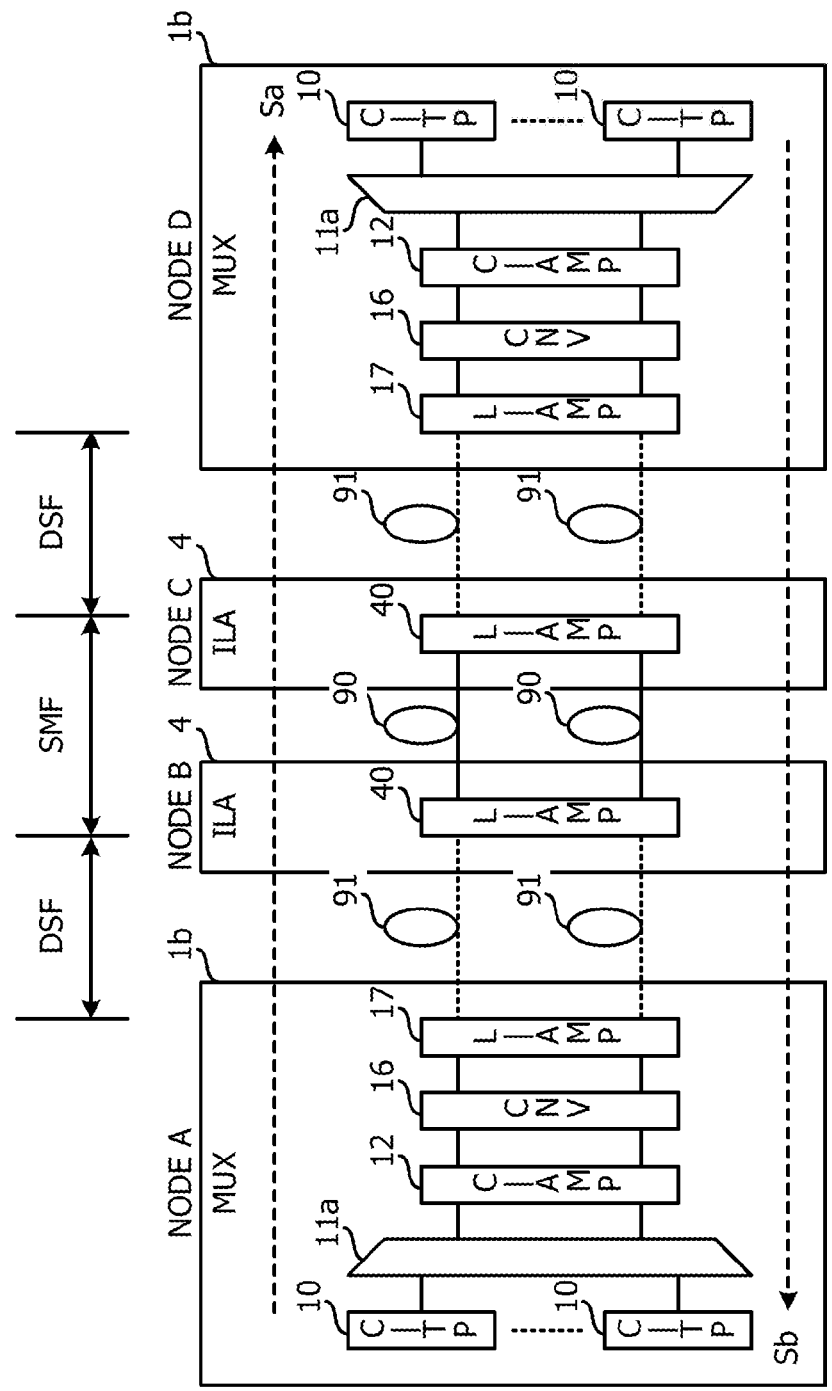
FIG. 9 is a configuration diagram illustrating a transmission system of a fourth embodiment.

FIG. 9 is a configuration diagram illustrating a transmission system of a fourth embodiment. In FIG. 9, a configuration common to FIG. 4 is given the same numeral and description thereof is omitted.

The transmission system includes nodes A to D coupled in series as one example. The nodes B and C adjacent to each other are coupled by a pair of SMFs 90 and the nodes A and B and the nodes C and D adjacent to each other are coupled by a pair of DSFs 91. At the nodes A and D that are transmitting node and receiving node, pieces of multiplexing/demultiplexing apparatus 1b including a wavelength converter 16 are set. At the nodes B and C that are relay nodes, the in-line amplifiers 4 compatible with the L-band are set.

The node A is one example of the first node coupled to the adjacent node B on the downstream side by the DSF 91 on the most upstream side on the relay path of the wavelength-multiplexed optical signal Sa, and the node D is one example of the second node coupled to the adjacent node C on the upstream side by the DSF 91 on the most downstream side on the relay path of the wavelength-multiplexed optical signal Sa. Furthermore, the node D is one example of the first node coupled to the adjacent node C on the downstream side by the DSF 91 on the most upstream side on the relay path of the wavelength-multiplexed optical signal Sb, and the node A is one example of the second node coupled to the adjacent node B on the upstream side by the DSF 91 on the most downstream side on the relay path of the wavelength-multiplexed optical signal Sb.

The pieces of multiplexing/demultiplexing apparatus 1b of the nodes A and D include the transponders 10, a multiplexing/demultiplexing unit 11a, and the amplifying unit 12 that are compatible with the C-band, the wavelength converter 16, and an amplifying unit 17 compatible with the L-band. A detailed configuration will be described below.

Figure 10:
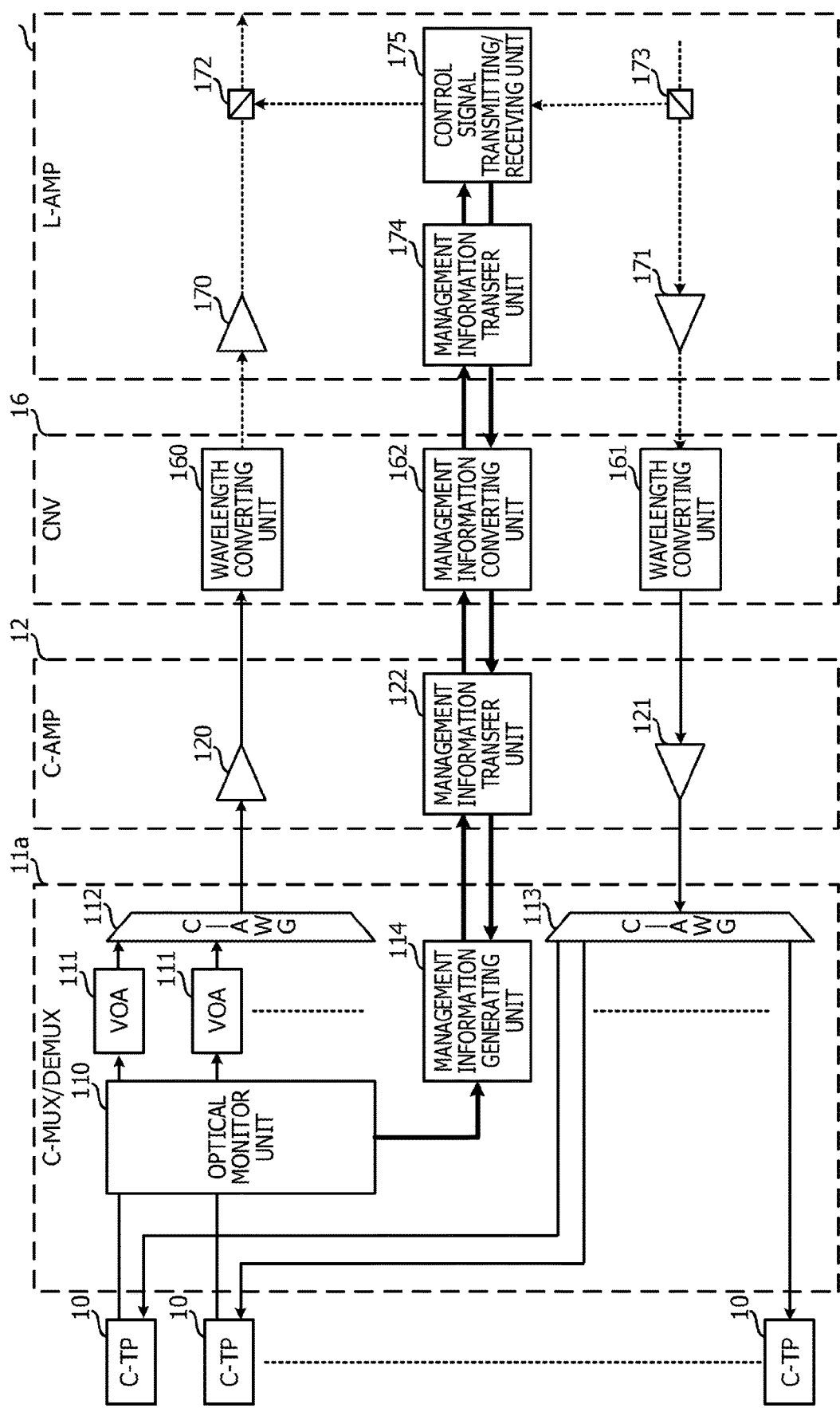
FIG. 10 is a configuration diagram illustrating one example of multiplexing/demultiplexing apparatus.

FIG. 10 is a configuration diagram illustrating one example of a multiplexing/demultiplexing apparatus. The multiplexing/demultiplexing apparatus in FIG. 10 may be the multiplexing/demultiplexing apparatus 1b illustrated in FIG. 9. In FIG. 10, the paths of optical signals in the C-band are represented by solid lines and the paths of optical signals in the L-band are represented by dotted lines. Furthermore, thick solid lines represent the paths of electrical signals.

The multiplexing/demultiplexing unit (C-MUX/DE-MUX) 11a includes an optical monitor unit 110, plural variable optical attenuators (VOA) 111, arrayed waveguide gratings (C-AWG) 112 and 113 compatible with the C-band, and a management information generating unit 114. The respective transponders 10 transmit optical signals different in the wavelength.

Optical signals are input from the respective transponders 10 to the optical monitor unit 110. The optical monitor unit 110 monitors the state of each optical signal and outputs information on the monitoring result to the management information generating unit 114. The optical monitor unit 110 includes a photodetector or the like.

Each optical signal is input to the VOA 111 to be attenuated to appropriate power. The arrayed waveguide grating 112 multiplexes the respective optical signals to generate the wavelength-multiplexed optical signal Sa or Sb. The wavelength-multiplexed optical signal Sa or Sb is input to the amplifying unit 12.

The amplifying unit 12 includes EDFAs 120 and 121 and a management information transfer unit 122. The amplifying unit 12 is one example of the first amplifying unit and amplifies the wavelength-multiplexed optical signal Sa or Sb in the C-band. The EDFA 120 amplifies the wavelength-multiplexed optical signal Sa or Sb input from the multiplexing/demultiplexing unit 11a and outputs the wavelength-multiplexed optical signal Sa or Sb to the wavelength converter 16.

The wavelength converter 16 includes wavelength converting units 160 and 161 and a management information converting unit 162. The wavelength converting unit 160 is one example of the first wavelength converting unit and converts the wavelength band of the wavelength-multiplexed optical signal Sa or Sb from the C-band to the L-band. The wavelength-multiplexed optical signal Sa or Sb in the L-band is input to the amplifying unit 17.

The amplifying unit 17 includes WDM couplers 172 and 173, EDFAs 170 and 171, a control signal transmitting/receiving unit 175, and a management information transfer unit 174. The amplifying unit 17 is one example of the second amplifying unit and amplifies the wavelength-multiplexed optical signal Sa or Sb in the L-band. The EDFA 170 amplifies the wavelength-multiplexed optical signal Sa or Sb and outputs the wavelength-multiplexed optical signal Sa or Sb to the WDM coupler 172. The WDM coupler 172 multiplexes an optical signal of a monitoring control channel with the wavelength-multiplexed optical signal Sa or Sb and guides the multiplexed signal to the adjacent node.

The WDM coupler 173 demultiplexes an optical signal of the monitoring control channel from the wavelength-multiplexed optical signal Sa or Sb in the L-band and outputs the optical signal to the control signal transmitting/receiving unit 175. The wavelength-multiplexed optical signal Sa or Sb that has passed through the WDM coupler 173 is amplified by the EDFA 171 and is output to the wavelength converter 16.

The wavelength converting unit 161 is one example of the second wavelength converting unit and converts the wavelength band of the wavelength-multiplexed optical signal Sa or Sb from the L-band to the C-band. The wavelength-multiplexed optical signal Sa or Sb in the C-band is input to the amplifying unit 12. The respective wavelength converting units 160 and 161 include the similar configuration as the configuration of the wavelength converter 50 in FIG. 3, for example.

The EDFA 121 amplifies the wavelength-multiplexed optical signal Sa or Sb in the C-band and outputs the wavelength-multiplexed optical signal Sa or Sb to the multiplexing/demultiplexing unit 11a. The arrayed waveguide grating 113 demultiplexes the wavelength-multiplexed optical signal Sa or Sb into optical signals of each wavelength and outputs the optical signals to the respective transponders 10. Each transponder 10 receives the optical signal.

The control signal transmitting/receiving unit 175 extracts management information of the wavelength-multiplexed optical signal Sa or Sb from the optical signal of the monitoring control channel demultiplexed from the wavelength-multiplexed optical signal Sa or Sb and transfers the management information to the management information converting unit 162 through the management information transfer unit 174. The management information converting unit 162 includes the similar functions as the above-described management information converting unit 509 and converts the management information to transmit the management information to the management information generating unit 114 through the management information transfer unit 122.

The management information generating unit 114 generates management information of each C-band channel from the monitoring result of the optical monitor unit 110 and transmits the management information to the management information converting unit 162 via the management information transfer unit 122. The management information converting unit 162 converts the management information to management information of an L-band channel and transfers the management information to the control signal transmitting/receiving unit 175 via the management information transfer unit 174. The control signal transmitting/receiving unit 175 generates an optical signal from the transferred management information and multiplexes the optical signal with the wavelength-multiplexed optical signal Sa or Sb by the WDM coupler 172.

The control signal transmitting/receiving unit 175 is composed of laser diode, photodetector, FPGA, and so forth. Furthermore, the management information generating unit 114, the management information transfer units 122 and 174, and the management information converting unit 162 include an FPGA or the like.

Referring to FIG. 9 again, for the wavelength-multiplexed optical signal Sa, the wavelength band is converted from the C-band to the L-band by the wavelength converter 16 at the node A, which is the transmitting node. The wavelength-multiplexed optical signal Sa in the L-band is input to the node B via the DSF 91. The in-line amplifier 4 of the node B amplifies the wavelength-multiplexed optical signal Sa and outputs the wavelength-multiplexed optical signal Sa to the SMF 90.

The wavelength-multiplexed optical signal Sa in the L-band is normally transmitted to the SMF 90. Therefore, in the present example, the in-line amplifier 5 including the wavelength converter 16 is not set at the nodes B and C. Thus, the cost is reduced.

The wavelength-multiplexed optical signal Sa is input from the SMF 90 to the node C. The in-line amplifier 4 of the node C amplifies the wavelength-multiplexed optical signal Sa and outputs the wavelength-multiplexed optical signal Sa to the DSF 91. The wavelength-multiplexed optical signal Sa is input from the DSF 91 to the node D.

At the node D, the wavelength band of the wavelength-multiplexed optical signal Sa is converted from the L-band to the C-band by the wavelength converter 16. For this reason, the transponders 10 compatible with the C-band may be set at the nodes A and D, which are the transmitting node and the receiving node. The wavelength-multiplexed optical signal Sb in the opposite direction is transmitted from the node D to the node A in procedure opposite to the above.

As above, in the present example, the wavelength converters 16 are set at the nodes A and D, which are the transmitting node and the receiving node. This makes it possible to set the transponders 10 compatible with the C-band at the transmitting node and the receiving node even in the case in which the transmitting node and the receiving node are coupled to the adjacent node by the DSFs 91, and the apparatus cost of the whole transmission system is reduced.

Furthermore, on the paths of the wavelength-multiplexed optical signals Sa and Sb, one set of relay nodes B and C that are coupled by the SMFs 90 and are adjacent to each other exist between the nodes A and D. Therefore, when a section of the SMFs 90 exists between sections of the DSFs 91, the wavelength-multiplexed optical signals Sa and Sb in the L-band are transmitted to the section of the SMFs 90 and therefore the excess wavelength converter 16 may be omitted and the apparatus cost is reduced.

Fifth Embodiment

Figure 11:
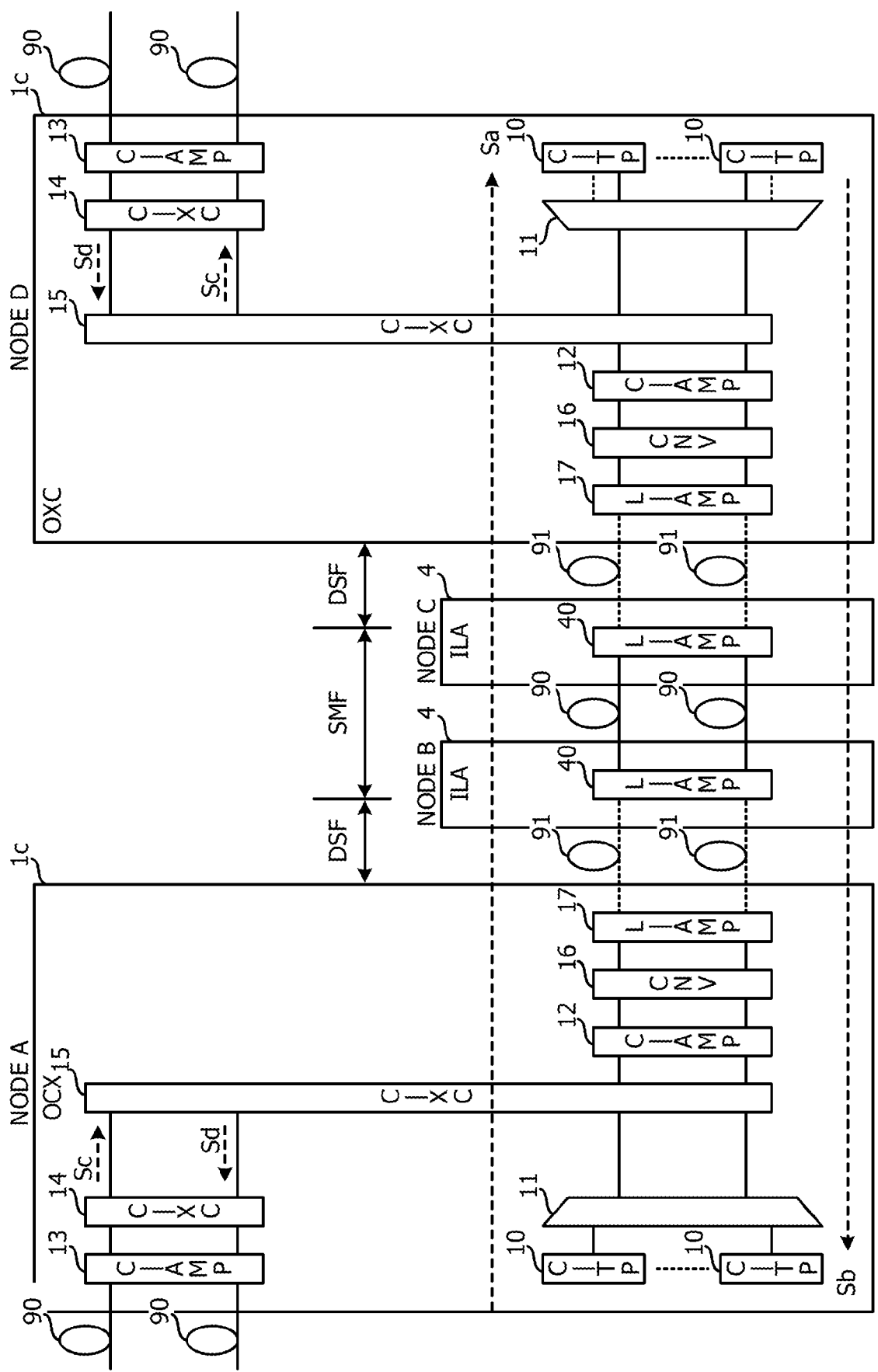
FIG. 11 is a configuration diagram illustrating a transmission system of a fifth embodiment.

FIG. 11 is a configuration diagram illustrating a transmission system of a fifth embodiment. In FIG. 11, a configuration common to FIG. 8 and FIG. 9 is given the same numeral and description thereof is omitted.

The transmission system includes nodes A to D coupled in series as one example. The nodes B and C adjacent to each other are coupled by a pair of SMFs 90 and the nodes A and B and the nodes C and D adjacent to each other are coupled by a pair of DSFs 91.

The wavelength converters 16 are set in the pieces of multiplexing/demultiplexing apparatus 1b in the fourth embodiment, whereas the wavelength converters 16 are set in pieces of optical cross-connect apparatus 1c in the present example. The pieces of optical cross-connect apparatus 1c are set at the nodes A and D that are transmitting node and receiving node and include the transponders 10, the multiplexing/demultiplexing unit 11, the amplifying units 12 and 13, and the optical cross-connect units 14 and 15 that are compatible with the C-band, the wavelength converter 16, and the amplifying unit 17 compatible with the L-band. A detailed configuration will be described below.

Figure 12:
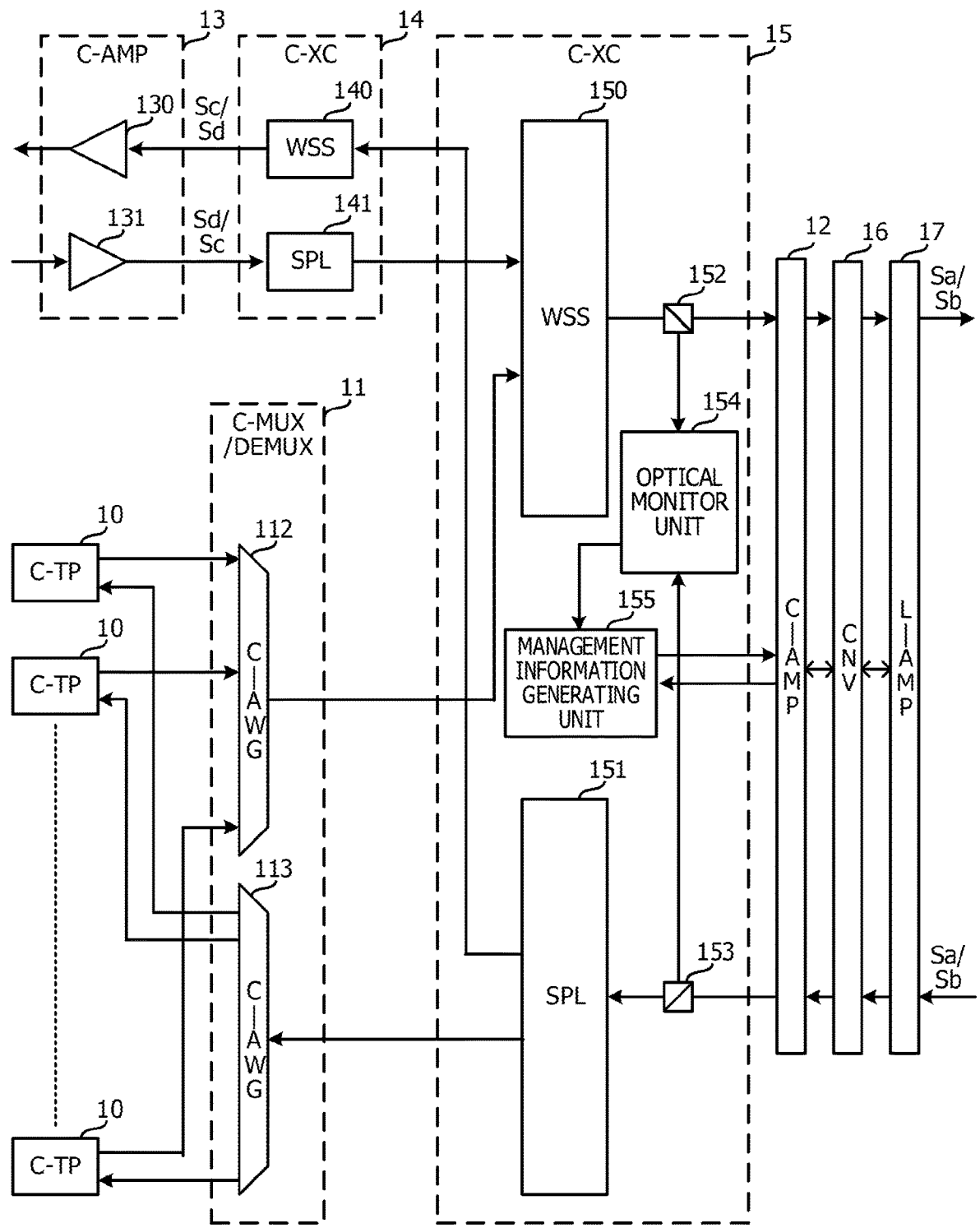
FIG. 12 is a configuration diagram illustrating one example of optical cross-connect apparatus.

FIG. 12 is a configuration diagram illustrating one example of optical cross-connect apparatus. The optical cross-connect apparatus in FIG. 12 may be the optical cross-connect apparatus 1c illustrated in FIG. 11. In FIG. 12, the paths of optical signals in the C-band are represented by solid lines and the paths of optical signals in the L-band are represented by dotted lines. Furthermore, thick solid lines represent the paths of electrical signals.

The multiplexing/demultiplexing unit (C-MUX/DE-MUX) 11 includes only the arrayed waveguide gratings 112 and 113 in the configuration of the above-described multiplexing/demultiplexing unit 11a. The wavelength-multiplexed optical signal Sa or Sb output from the arrayed waveguide grating 112 is input to the optical cross-connect unit 15. Furthermore, the wavelength-multiplexed optical signal Sa or Sb output from the optical cross-connect unit 15 is input to the arrayed waveguide grating 113.

The amplifying unit 13 includes EDFAs 130 and 131. The EDFA 131 amplifies the wavelength-multiplexed optical signal Sc or Sd in the C-band from another route and outputs the wavelength-multiplexed optical signal Sc or Sd to the optical cross-connect unit 14. The optical cross-connect unit 14 includes a wavelength selective switch (WSS) 140 and an optical splitter 141. The optical splitter 141 guides the wavelength-multiplexed optical signal Sc or Sd to the optical cross-connect unit 15.

The optical cross-connect unit 15 includes a wavelength selective switch 150 compatible with the C-band, an optical splitter 151, WDM couplers 152 and 153, an optical monitor unit 154, and a management information generating unit 155. To the wavelength selective switch 150, the wavelength-multiplexed optical signal Sc or Sd is input from the optical splitter 141 and the wavelength-multiplexed optical signal Sa or Sb is input from the arrayed waveguide grating 112.

The wavelength selective switch 150 is one example of the first wavelength selective switch and carries out wavelength multiplexing of the other wavelength-multiplexed optical signal Sc or Sd in the C-band with the wavelength-multiplexed optical signal Sa or Sb in the C-band. The wavelength-multiplexed optical signal Sa or Sb is input from the wavelength selective switch 150 to the WDM coupler 152. The WDM coupler 152 splits the wavelength-multiplexed optical signal Sa or Sb and guides the wavelength-multiplexed optical signal Sa or Sb to the optical monitor unit 154 and the amplifying unit 12. The wavelength-multiplexed optical signal Sa or Sb is output from the amplifying unit 12 to the DSF 91 via the wavelength converter 16 and the amplifying unit 17 and is received at the receiving node.

Furthermore, to the WDM coupler 153, the wavelength-multiplexed optical signal Sa or Sb transmitted from the transmitting node is input via the amplifying unit 17, the wavelength converter 16, and the amplifying unit 12. The WDM coupler 153 splits the wavelength-multiplexed optical signal Sa or Sb and guides the wavelength-multiplexed optical signal Sa or Sb to the optical monitor unit 154 and the optical splitter 151. The optical splitter 151 splits the wavelength-multiplexed optical signal Sa or Sb and guides the wavelength-multiplexed optical signal Sa or Sb to the optical cross-connect unit 14 and the multiplexing/demultiplexing unit 11.

The wavelength selective switch 140 is one example of the first wavelength demultiplexing unit and demultiplexes the other wavelength-multiplexed optical signal Sc or Sd from the wavelength-multiplexed optical signal Sa or Sb input from the optical splitter 151. The wavelength-multiplexed optical signal Sc or Sd is amplified by the EDFA 130 and is output to the relevant route.

Furthermore, the optical monitor unit 154 monitors the state of the wavelength-multiplexed optical signal Sa or Sb output from the wavelength selective switch 150 and the wavelength-multiplexed optical signal Sa or Sb input to the optical splitter 151 and outputs information on the monitoring result to the management information generating unit 155. The management information generating unit 155 generates management information of the wavelength-multiplexed optical signal Sa or Sb from the monitoring result and outputs the management information to the amplifying unit 12. Processing of the management information is as described above. The optical monitor unit 154 includes a photodetector or the like, and the management information generating unit 155 includes an FPGA or the like.

In the present example, the wavelength converting units 160 and 161 of the wavelength converter 16 convert the wavelength band of the wavelength-multiplexed optical signal Sa or Sb with which the other wavelength-multiplexed optical signal Sc or Sd is wavelength-multiplexed. For this reason, in the case in which the pieces of optical cross-connect apparatus 1c are set at the nodes A and D, which are the transmitting node and the receiving node, the transponders 10 compatible with the C-band may be set at the nodes A and D although the transmitting node and the receiving node are coupled to the adjacent node by the DSFs 91. Therefore, the apparatus cost of the whole transmission system is reduced.

Sixth Embodiment

Figure 13:
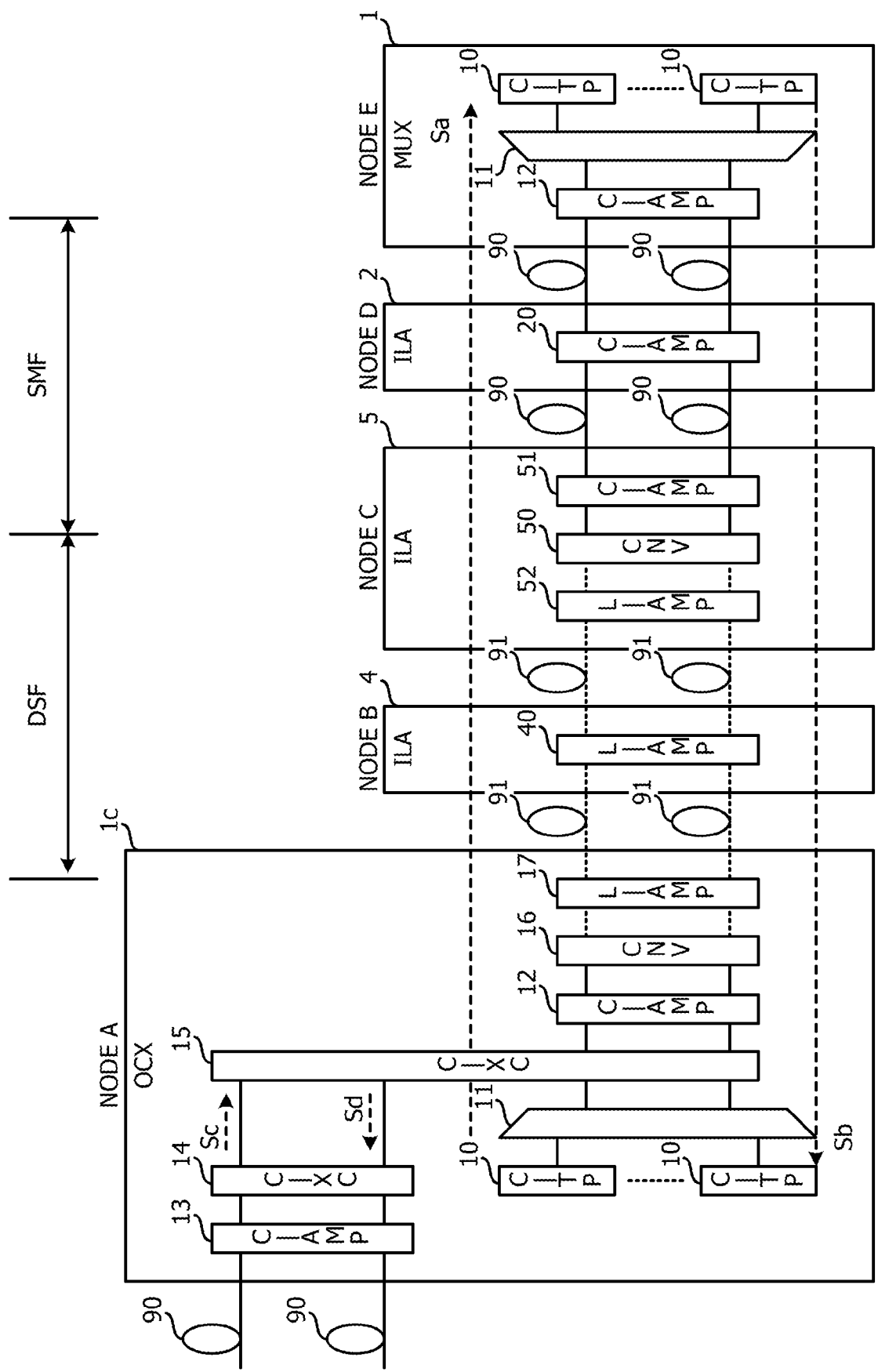
FIG. 13 is a configuration diagram illustrating a transmission system of a sixth embodiment.

FIG. 13 is a configuration diagram illustrating a transmission system of a sixth embodiment. In FIG. 13, a configuration common to FIG. 4 and FIG. 11 is given the same numeral and description thereof is omitted.

The transmission system includes nodes A to E coupled in series as one example. In the present example, the case in which a transmission path of the wavelength-multiplexed optical signals Sa and Sb is switched from one of the SMF 90 and the DSF 91 to the other halfway is cited. The nodes A to C adjacent to each other are coupled by a pair of DSFs 91 and the nodes C to E adjacent to each other are coupled by a pair of SMFs 90.

The optical cross-connect apparatus 1c is set at the node A and the multiplexing/demultiplexing apparatus 1 is set at the node E. Furthermore, the in-line amplifier 4 compatible with the L-band is set at the node B and the in-line amplifier 2 compatible with the C-band is set at the node D. The in-line amplifier 5 including the wavelength converter 50 is set at the node C.

The wavelength-multiplexed optical signal Sa is transmitted from the node A and is relayed by the nodes B to D to be received at the node E. Thus, regarding the wavelength-multiplexed optical signal Sa, the node A is the transmitting node and the nodes B to D are relay nodes and the node E is the receiving node.

The node A is one example of the first node coupled to the adjacent node B on the downstream side by the DSF 91 on the most upstream side on the relay path of the wavelength-multiplexed optical signal Sa. Furthermore, the node C is one example of the second node coupled to the adjacent node B on the upstream side by the DSF 91 on the most downstream side on the relay path of the wavelength-multiplexed optical signal Sa.

The wavelength band of the wavelength-multiplexed optical signal Sa is converted from the C-band to the L-band by the wavelength converter 16 of the transmitting node A and is converted from the L-band to the C-band by the wavelength converter 50 of the relay node C. Thus, the wavelength band of the wavelength-multiplexed optical signal Sa becomes the L-band only in the section of the DSFs 91 and the wavelength-multiplexed optical signal Sa is normally transmitted.

On the other hand, the wavelength-multiplexed optical signal Sb is transmitted from the node E and is relayed by the nodes B to D to be received at the node A. Thus, regarding the wavelength-multiplexed optical signal Sb, the node E is the transmitting node and the nodes B to D are relay nodes and the node A is the receiving node.

The node C is one example of the first node coupled to the adjacent node B on the downstream side by the DSF 91 on the most upstream side on the relay path of the wavelength-multiplexed optical signal Sb. Furthermore, the node A is one example of the second node coupled to the adjacent node B on the upstream side by the DSF 91 on the most downstream side on the relay path of the wavelength-multiplexed optical signal Sb.

The wavelength band of the wavelength-multiplexed optical signal Sb is converted from the C-band to the L-band by the wavelength converter 50 of the relay node C and is converted from the L-band to the C-band by the wavelength converter 16 of the receiving node A. Thus, the wavelength band of the wavelength-multiplexed optical signal Sb becomes the L-band only in the section of the DSFs 91 and the wavelength-multiplexed optical signal Sb is normally transmitted.

As above, the wavelength converters 16 and 50 are set at the node A, which is the transmitting node or the receiving node, and the node C, which is the relay node. For this reason, the transponders 10 compatible with the C-band may be set at the node A and the node E. Therefore, the apparatus cost of the whole transmission system is reduced in the case in which the transmission path of the wavelength-multiplexed optical signals Sa and Sb is switched from one of the SMF 90 and the DSF 91 to the other halfway. Although the optical cross-connect apparatus 1c is set at the node A in the present example, the multiplexing/demultiplexing apparatus 1b may be set instead of the optical cross-connect apparatus 1c.

Seventh Embodiment

Figure 14:
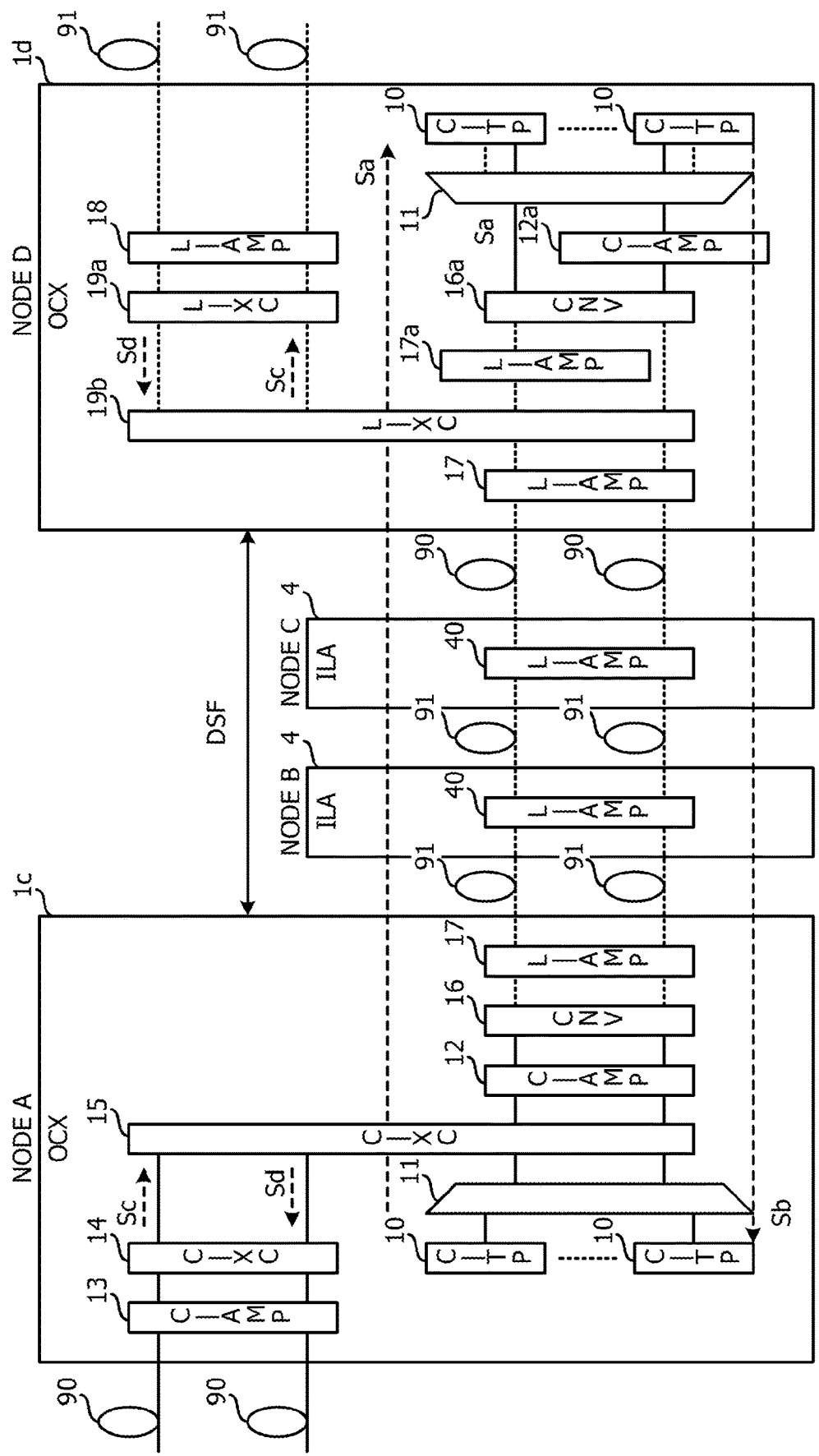
FIG. 14 is a configuration diagram illustrating a transmission system of a seventh embodiment.

FIG. 14 is a configuration diagram illustrating a transmission system of a seventh embodiment. In FIG. 14, a configuration common to FIG. 11 is given the same numeral and description thereof is omitted.

The transmission system of the present example is a transmission system in which the optical cross-connect apparatus 1c that is set at the node D in the fifth embodiment and is compatible with the C-band is replaced by optical cross-connect apparatus 1d compatible with the L-band. The optical cross-connect apparatus 1d includes the transponders 10, the multiplexing/demultiplexing unit 11, and an amplifying unit 12a that are compatible with the C-band, a wavelength converter 16a, and optical cross-connect units 19a and 19b and amplifying units 17, 17a, and 18 that are compatible with the L-band. A detailed configuration will be described below.

Figure 15:
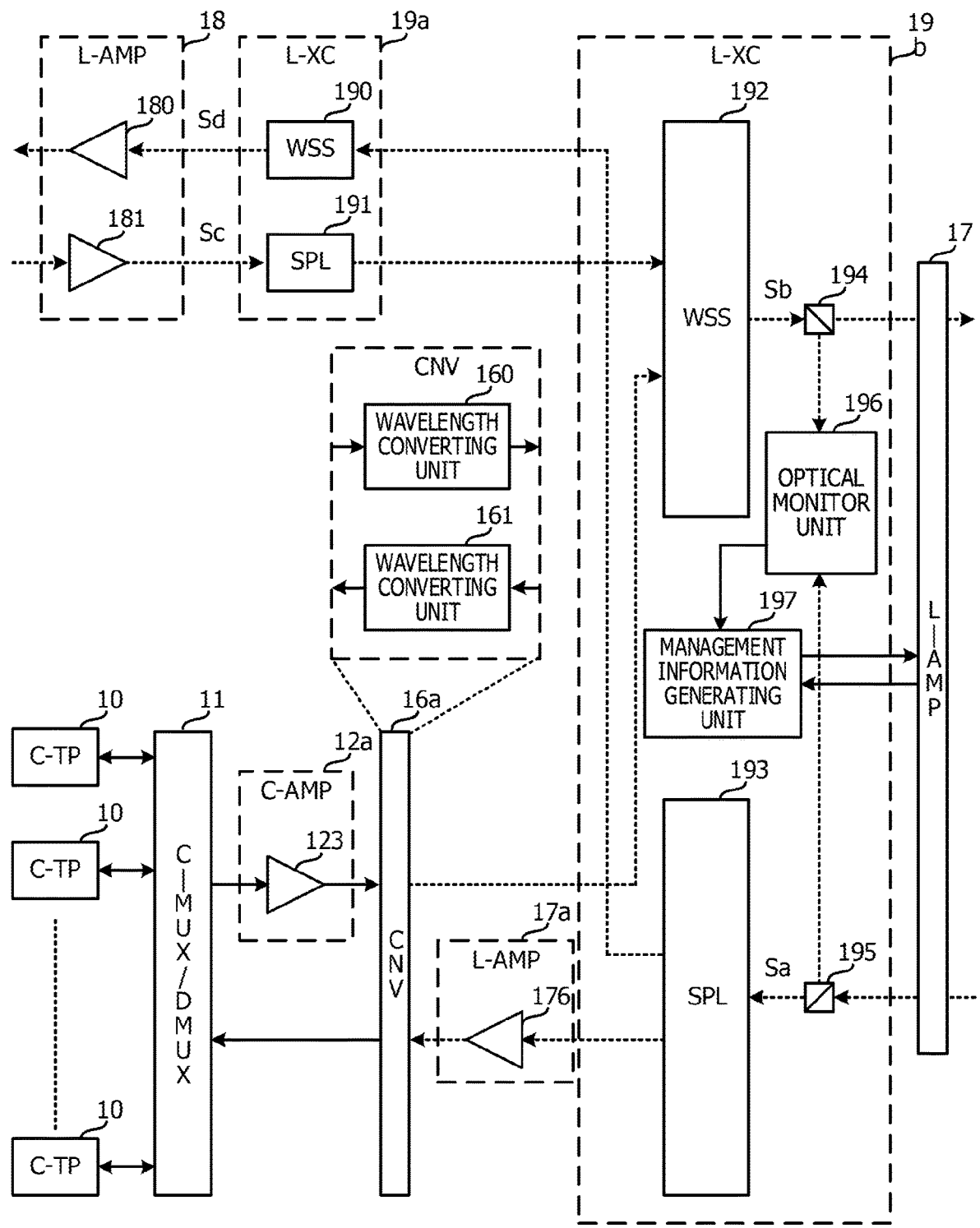
FIG. 15 is a configuration diagram illustrating another example of the optical cross-connect apparatus.

FIG. 15 is a configuration diagram illustrating another example of the optical cross-connect apparatus. The optical cross-connect apparatus in FIG. 15 may be the optical cross-connect apparatus 1d illustrated in FIG. 14. In FIG. 15, the paths of optical signals in the C-band are represented by solid lines and the paths of optical signals in the L-band are represented by dotted lines. Furthermore, thick solid lines represent the paths of electrical signals.

The amplifying unit 18 includes EDFAs 180 and 181. The EDFA 181 amplifies the wavelength-multiplexed optical signal Sd in the L-band from another route and outputs the wavelength-multiplexed optical signal Sd to the optical cross-connect unit 19a. The optical cross-connect unit 19a includes a wavelength selective switch 190 and an optical splitter 191. The optical splitter 191 guides the wavelength-multiplexed optical signal Sd to the optical cross-connect unit 19b.

The optical cross-connect unit 19b includes a wavelength selective switch 192 compatible with the L-band, an optical splitter 193, WDM couplers 194 and 195, an optical monitor unit 196, and a management information generating unit 197. The wavelength-multiplexed optical signal Sd is input from the optical splitter 191 to the wavelength selective switch 192.

Furthermore, the wavelength-multiplexed optical signal Sb output from the multiplexing/demultiplexing unit 11 is input to the amplifying unit 12a compatible with the C-band. The amplifying unit 12a includes an EDFA 123. The EDFA 123 amplifies the wavelength-multiplexed optical signal Sb and outputs the wavelength-multiplexed optical signal Sb to the wavelength converter 16a.

The wavelength converter 16a includes the wavelength converting units 160 and 161. The wavelength converting unit 160 converts the wavelength band of the wavelength-multiplexed optical signal Sb from the C-band to the L-band. The wavelength-multiplexed optical signal Sb in the L-band is input to the wavelength selective switch 192.

The wavelength selective switch 192 carries out wavelength multiplexing of the other wavelength-multiplexed optical signal Sd with the wavelength-multiplexed optical signal Sb. The wavelength-multiplexed optical signal Sb is input from the wavelength selective switch 192 to the WDM coupler 194. The WDM coupler 194 splits the wavelength-multiplexed optical signal Sb and guides the wavelength-multiplexed optical signal Sb to the optical monitor unit 196 and the amplifying unit 17. The wavelength-multiplexed optical signal Sb is output from the amplifying unit 17 to the DSF 91 and is received at the receiving node.

Furthermore, to the WDM coupler 195, the wavelength-multiplexed optical signal Sa transmitted from the transmitting node is input via the amplifying unit 17. The WDM coupler 195 splits the wavelength-multiplexed optical signal Sa and guides the wavelength-multiplexed optical signal Sa to the optical monitor unit 196 and the optical splitter 193. The optical splitter 193 splits the wavelength-multiplexed optical signal Sa and guides the wavelength-multiplexed optical signal Sa to the optical cross-connect unit 19a and the amplifying unit 17a compatible with the L-band.

The amplifying unit 17a includes an EDFA 176. The EDFA 176 amplifies the wavelength-multiplexed optical signal Sa and outputs the wavelength-multiplexed optical signal Sa to the wavelength converter 16a. The wavelength band of the wavelength-multiplexed optical signal Sa is converted from the L-band to the C-band by the wavelength converting unit 161. The wavelength-multiplexed optical signal Sa in the C-band is input to the multiplexing/demultiplexing unit 11.

The wavelength selective switch 190 demultiplexes the other wavelength-multiplexed optical signal Sc from the wavelength-multiplexed optical signal Sa input from the optical splitter 193. The wavelength-multiplexed optical signal Sc is amplified by the EDFA 180 and is output to the relevant route.

Furthermore, the optical monitor unit 196 monitors the state of the wavelength-multiplexed optical signal Sb output from the wavelength selective switch 192 and the wavelength-multiplexed optical signal Sa input to the optical splitter 193 and outputs information on the monitoring result to the management information generating unit 197. The management information generating unit 197 generates management information of the wavelength-multiplexed optical signal Sa or Sb from the monitoring result and outputs the management information to the amplifying unit 17. Processing of the management information is as described above. The optical monitor unit 196 includes a photodetector or the like, and the management information generating unit 197 includes an FPGA or the like.

In the present example, in the wavelength converter 16a, the wavelength converting unit 160 converts the wavelength band of the wavelength-multiplexed optical signal Sb before wavelength multiplexing of the other wavelength-multiplexed optical signal Sd and the wavelength converting unit 161 converts the wavelength band of the wavelength-multiplexed optical signal Sa after demultiplexing of the other wavelength-multiplexed optical signal Sc. For this reason, the transponders 10 compatible with the C-band may be set at the node D, at which the optical cross-connect apparatus 1d compatible with the L-band is set. Therefore, the apparatus cost of the whole transmission system is reduced.

Eighth Embodiment

Figure 16:
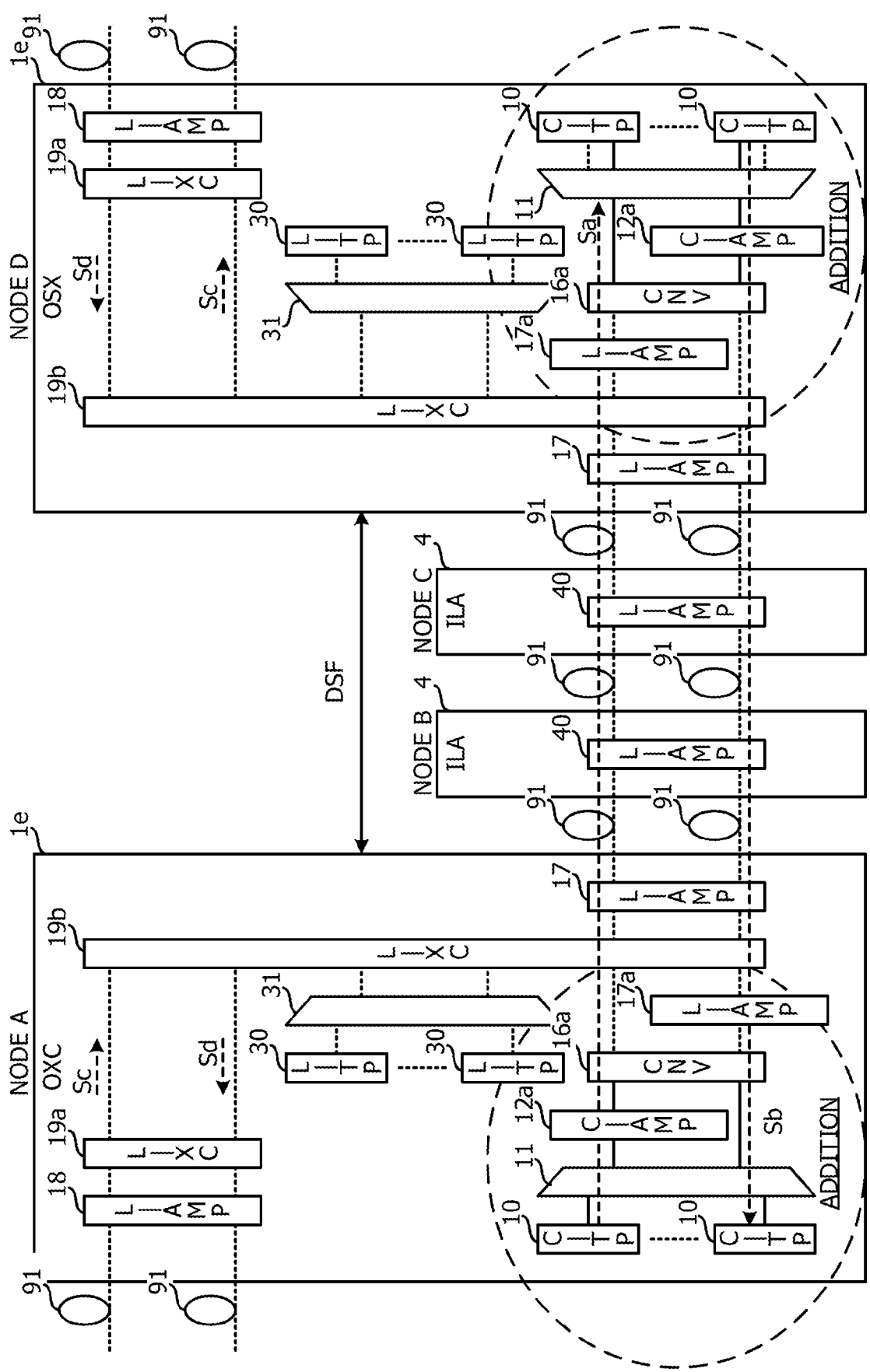
FIG. 16 is a configuration diagram illustrating a transmission system of an eighth embodiment.

FIG. 16 is a configuration diagram illustrating a transmission system of an eighth embodiment. In FIG. 16, a configuration common to FIG. 3 and FIG. 14 is given the same numeral and description thereof is omitted.

In the seventh embodiment, the optical cross-connect apparatus 1d compatible with the L-band is set at the node D and the optical cross-connect apparatus 1c compatible with the C-band is set at the node A. In contrast thereto, in the present example, optical cross-connect apparatus 1e compatible with the L-band is set at both nodes A and D.

As such a transmission system, what is obtained by adding optical transmission equipment compatible with the C-band to a transmission system compatible with the L-band in order to increase an optical line of the C-band is cited, for example. For example, in the optical cross-connect apparatus 1e, transponders 30 and a multiplexing/demultiplexing unit 31 for providing optical lines of the L-band are set in addition to the configuration of the above-described optical cross-connect apparatus 1d. The multiplexing/demultiplexing unit 31 is coupled to the optical splitter 193.

By adding the transponders 10, the multiplexing/demultiplexing unit 11, the amplifying units 12a and 17a, and the wavelength converter 16a to this configuration (see dotted circle), transmission of the wavelength-multiplexed optical signals Sa and Sb in the C-band is enabled similarly to the seventh embodiment. This makes it possible to provide optical lines of the C-band in a transmission system compatible with the L-band.

As described with reference to FIG. 15, the wavelength selective switch 192 carries out wavelength multiplexing of the other wavelength-multiplexed optical signal Sd in the L-band with the wavelength-multiplexed optical signal Sb whose wavelength band has been converted by the wavelength converting unit 160. Furthermore, the wavelength selective switch 190 demultiplexes the other wavelength-multiplexed optical signal Sd from the wavelength-multiplexed optical signal Sb and the wavelength converting unit 161 converts the wavelength band of the wavelength-multiplexed optical signal Sb from which the other wavelength-multiplexed optical signal Sd has been demultiplexed.

In the present example, the above-described configuration is set at the node A in addition to the node D. At the node A, processing similar to the above is executed regarding the wavelength-multiplexed optical signal Sa in the opposite direction and the other wavelength-multiplexed optical signal Sc. The wavelength selective switch 192 is one example of the second wavelength selective switch and the wavelength selective switch 190 is one example of the second wavelength demultiplexing unit. Furthermore, the amplifying unit 12a is one example of the first amplifying unit and the amplifying unit 17a is one example of the second amplifying unit.

According to the above-described configuration, the transponders 10 compatible with the C-band may be set at the nodes A and D, at which the pieces of optical cross-connect apparatus 1e compatible with L-band are set. Therefore, the apparatus cost of the whole transmission system is reduced.

Ninth Embodiment

Figure 17:
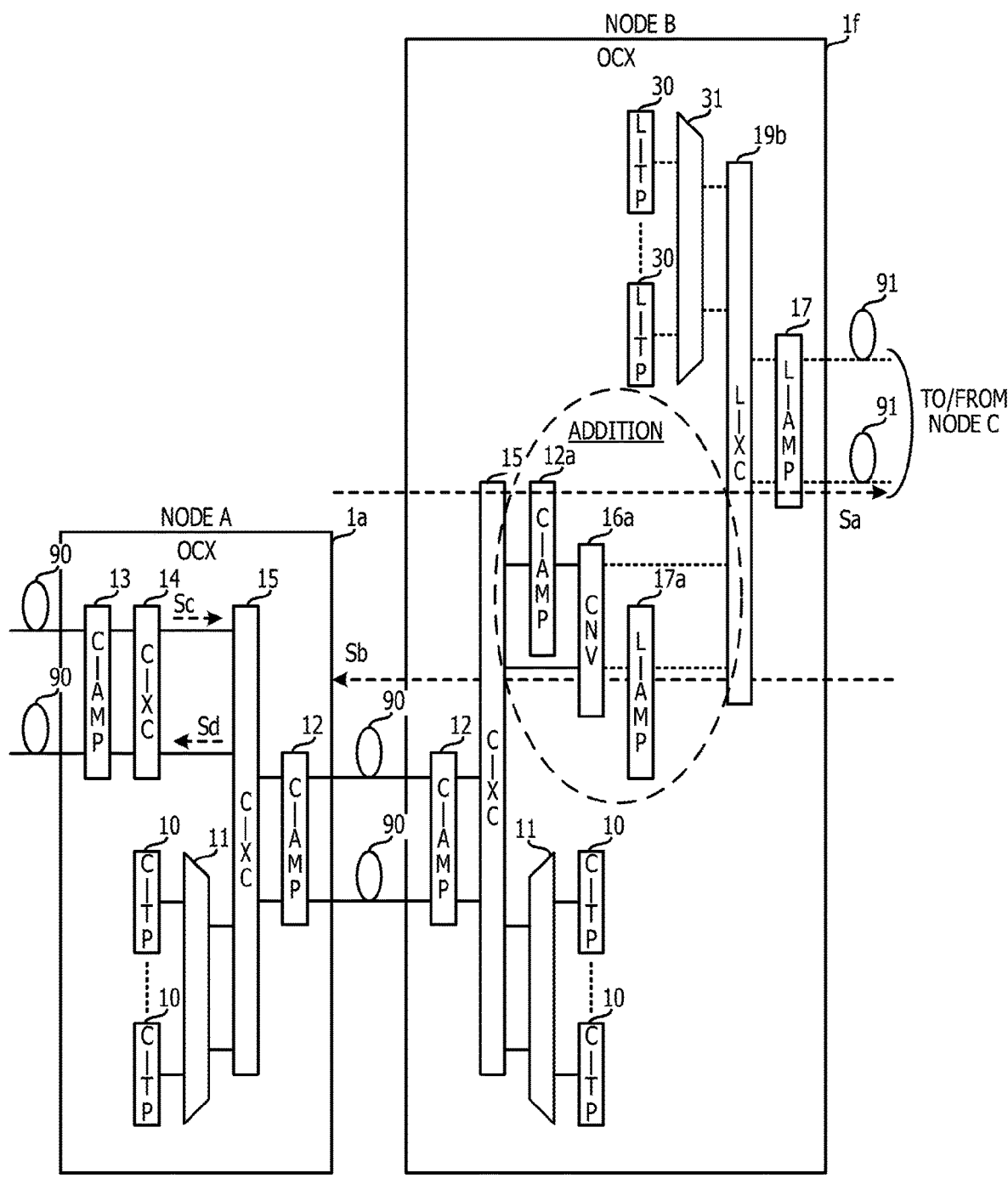
FIG. 17 is a configuration diagram (first diagram) illustrating a transmission system of a ninth embodiment.
Figure 18:
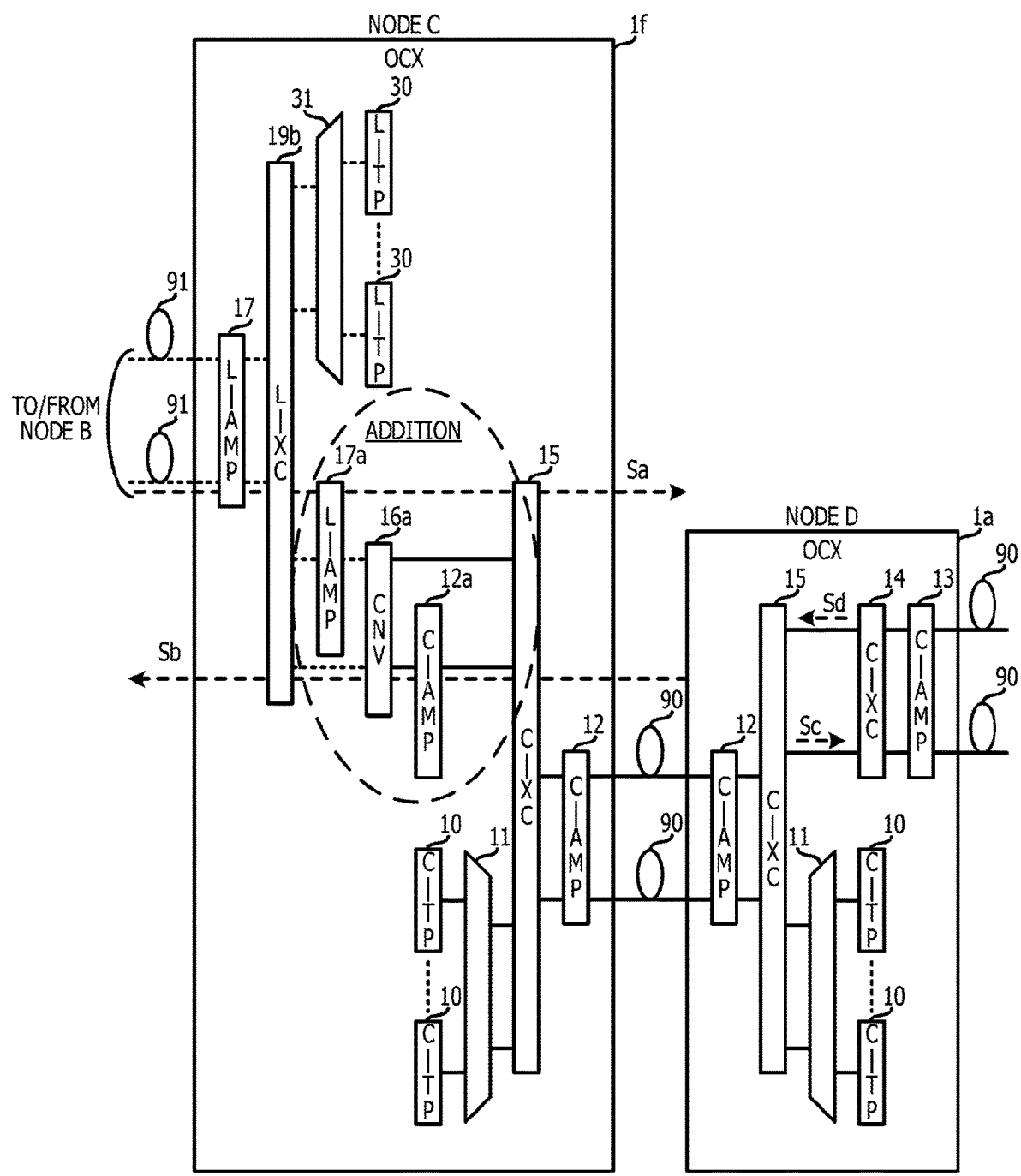
FIG. 18 is a configuration diagram (second diagram) illustrating the transmission system of the ninth embodiment.

FIG. 17 and FIG. 18 are configuration diagrams illustrating a transmission system of a ninth embodiment. In FIG. 17 and FIG. 18, a configuration common to FIG. 8 and FIG. 16 is given the same numeral and description thereof is omitted.

The transmission system of the present example is a transmission system in which pieces of optical cross-connect apparatus 1f in which optical lines of the L-band and the C-band are housed separately are set instead of the in-line amplifiers 5 at the relay nodes B and C in the transmission system of the third embodiment. At the nodes A and D that are transmitting node and receiving node, pieces of optical cross-connect apparatus 1a compatible with the C-band are set.

The optical cross-connect apparatus 1f includes the transponders 10, the multiplexing/demultiplexing unit 11, the optical cross-connect unit 15, and the amplifying unit 12 as a configuration compatible with the C-band and includes the transponders 30, the multiplexing/demultiplexing unit 31, the optical cross-connect unit 19b, and the amplifying unit 17 as a configuration compatible with the L-band.

At the node B, if the node B includes only the above-described configuration, a wavelength-multiplexed optical signal in the C-band is transmitted and received between the node A and the node B by the transponders 10, the multiplexing/demultiplexing unit 11, the optical cross-connect unit 15, and the amplifying unit 12. Furthermore, a wavelength-multiplexed optical signal in the L-band is transmitted and received between the node B and the node C by the transponders 30, the multiplexing/demultiplexing unit 31, the optical cross-connect unit 19b, and the amplifying unit 17. Therefore, the node B may only transmit and receive signals of the optical lines of the C-band and the L-band by separate routes. This also applies to the node C.

Therefore, in the present example, the wavelength converter 16a and the amplifying units 12a and 17a are added between the optical cross-connect unit 19b of the L-band and the optical cross-connect unit 15 of the C-band (see "ADDED").

Due to this, the node B may convert the wavelength-multiplexed optical signal Sa in the C-band input from the node A to the L-band and relay the wavelength-multiplexed optical signal Sa to the node C, and may convert the wavelength-multiplexed optical signal Sb in the L-band input from the node C to the C-band and relay the wavelength-multiplexed optical signal Sb to the node A. Furthermore, the node C may convert the wavelength-multiplexed optical signal Sb in the C-band input from the node D to the L-band and relay the wavelength-multiplexed optical signal Sb to the node B, and may convert the wavelength-multiplexed optical signal Sa in the L-band input from the node B to the C-band and relay the wavelength-multiplexed optical signal Sa to the node D.

This allows the wavelength-multiplexed optical signals Sa and Sb to be transmitted between the nodes A and D and thus makes it possible to provide optical lines by using the transponders 10 of the C-band set at the nodes A and D.

As above, when wavelength-multiplexed optical signals are transmitted and received with plural routes different in the kind of optical fiber separately, optical lines may be flexibly set irrespective of limitation of the wavelength band by converting the wavelength band of the wavelength-multiplexed optical signals through addition of the wavelength converter 16a and the amplifying units 12a and 17a.

Figure 19:
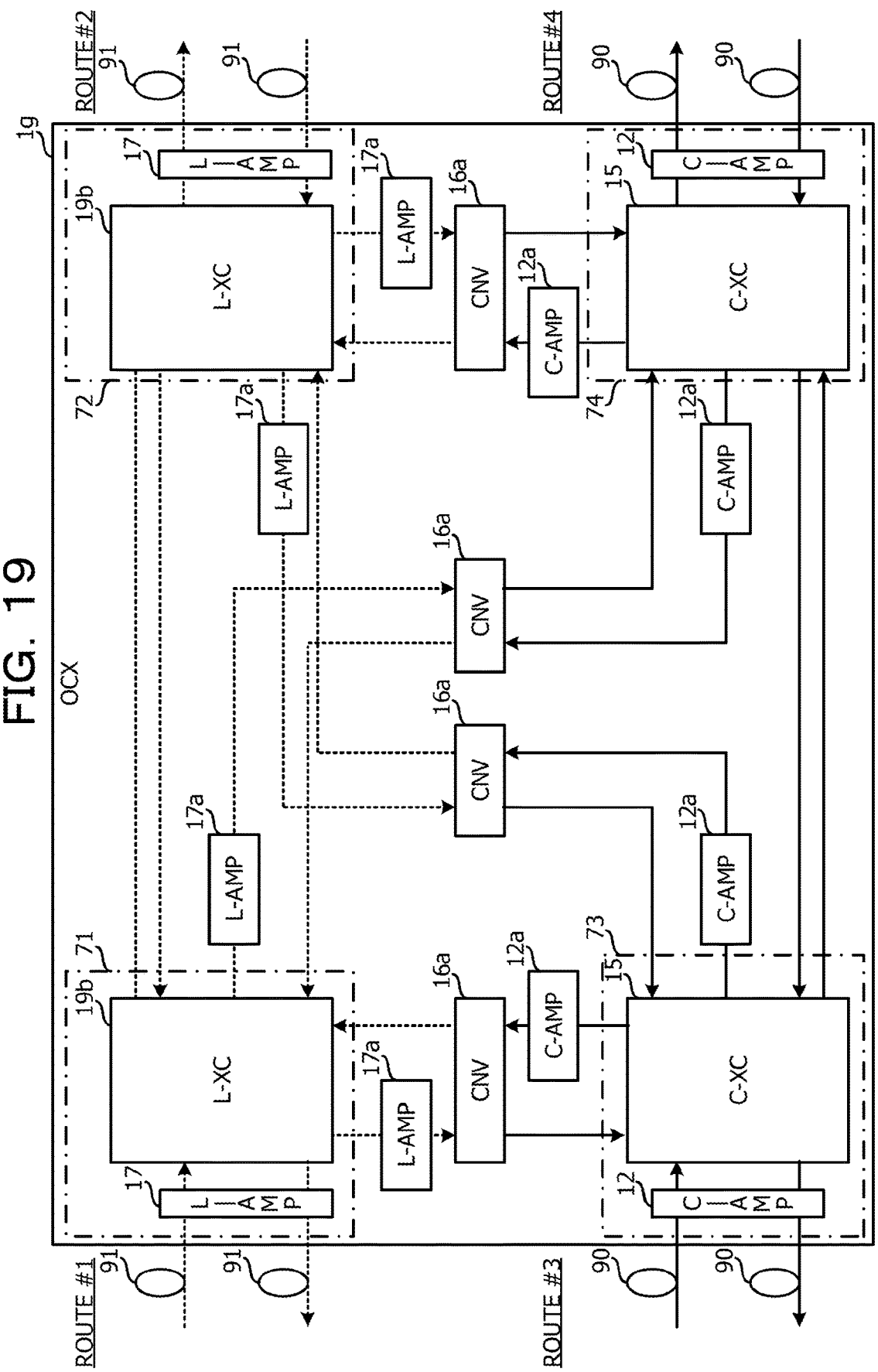
FIG. 19 is a configuration diagram illustrating another example of the optical cross-connect apparatus.

FIG. 19 is a configuration diagram illustrating another example of the optical cross-connect apparatus. In FIG. 19, a configuration common to FIG. 17 and FIG. 18 is given the same numeral and description thereof is omitted. In FIG. 19, the paths of optical signals in the C-band are represented by solid lines and the paths of optical signals in the L-band are represented by dotted lines.

The optical cross-connect apparatus 1g includes four transmitting/receiving units 71 to 74 that each transmit and receive wavelength-multiplexed optical signals with four routes #1 to #4 as one example. Routes #1 and #2 include the DSFs 91 and routes #3 and #4 include the SMFs 90.

The transmitting/receiving units 71 and 72 include the optical cross-connect unit 19b and the amplifying unit 17 compatible with the L-band. The amplifying unit 17 amplifies a wavelength-multiplexed optical signal input from the DSF 91 and outputs the wavelength-multiplexed optical signal to the optical cross-connect unit 19b. Furthermore, the amplifying unit 17 amplifies a wavelength-multiplexed optical signal input from the optical cross-connect unit 19b and outputs the wavelength-multiplexed optical signal to the DSF 91.

The transmitting/receiving units 73 and 74 include the optical cross-connect unit 15 and the amplifying unit 12 compatible with the C-band. The amplifying unit 12 amplifies a wavelength-multiplexed optical signal input from the SMF 90 and outputs the wavelength-multiplexed optical signal to the optical cross-connect unit 15. Furthermore, the amplifying unit 12 amplifies a wavelength-multiplexed optical signal input from the optical cross-connect unit 15 and outputs the wavelength-multiplexed optical signal to the SMF 90.

The optical cross-connect units 19b are directly coupled to each other between the transmitting/receiving units 71 and 72 of routes #1 and #2 of the DSFs 91. Due to this, wavelength-multiplexed optical signals in the L-band are relayed between route #1 and route #2.

Furthermore, the optical cross-connect units 15 are directly coupled to each other between the transmitting/receiving units 73 and 74 of routes #3 and #4 of the SMFs 90. Due to this, wavelength-multiplexed optical signals in the C-band are relayed between route #3 and route #4.

On the other hand, the transmitting/receiving units 71 to 74 of routes #1 to #4 different in the kind of optical fiber are coupled through the wavelength converters 16a and the amplifying units 12a and 17a. For example, the optical cross-connect unit 19b compatible with the L-band and the optical cross-connect unit 15 compatible with the C-band are coupled through the wavelength converter 16a and the amplifying units 12a and 17a.

Thus, a wavelength-multiplexed optical signal output from the optical cross-connect unit 19b is amplified by the amplifying unit 17a. Then, the wavelength band is converted from the L-band to the C-band by the wavelength converter 16a and the wavelength-multiplexed optical signal is input to the optical cross-connect unit 15. Furthermore, a wavelength-multiplexed optical signal output from the optical cross-connect unit 15 is amplified by the amplifying unit 12a. Then, the wavelength band is converted from the C-band to the L-band by the wavelength converter 16a and the wavelength-multiplexed optical signal is input to the optical cross-connect unit 19b.

Therefore, the optical cross-connect apparatus 1g may relay wavelength-multiplexed optical signals among routes #1 to #4 different in the kind of optical fiber.

In the above-described respective embodiments, the L-band is cited as the second wavelength band. However, the wavelength band is not limited thereto and, for example, the S-band may be used as the second wavelength band. Furthermore, transmission methods of embodiments are carried out by the transmission systems of the above-described respective embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission system comprising:
a plurality of nodes in which respective adjacent nodes are coupled by a first kind of optical fiber compatible with light in a first wavelength band or a second kind of optical fiber compatible with light in a second wavelength band,
wherein the plurality of nodes includes
a transmitting node that generates a wavelength-multiplexed optical signal in the first wavelength band by carrying out wavelength multiplexing of a plurality of optical signals, and transmits the wavelength-multiplexed optical signal,
a receiving node that demultiplexes the plurality of optical signals from the wavelength-multiplexed optical signal and receives the plurality of optical signals, and
one or more relay nodes that relay the wavelength-multiplexed optical signal from the transmitting node to the receiving node through the first kind or the second kind of optical fiber,
wherein a first node coupled to an adjacent node on a downstream side by the second kind of optical fiber on a most upstream side on a relay path of the wavelength-multiplexed optical signal in the plurality of nodes, includes a first wavelength converting circuit that converts a wavelength band of the wavelength-multiplexed optical signal from the first wavelength band to the second wavelength band and a second wavelength multiplexing circuit that carries out wavelength multiplexing of another wavelength-multiplexed optical signal in the second wavelength band with the wavelength-multiplexed optical signal whose wavelength band has been converted by the first wavelength converting circuit, and
wherein a second node coupled to an adjacent node on an upstream side by the second kind of optical fiber on a most downstream side on the relay path of the wavelength-multiplexed optical signal in the plurality of nodes, includes a second wavelength converting circuit that converts the wavelength band of the wavelength-multiplexed optical signal from the second wavelength band to the first wavelength band and a second wavelength demultiplexing circuit that demultiplexes the other wavelength-multiplexed optical signal from the wavelength-multiplexed optical signal, wherein
the second wavelength converting circuit converts the wavelength band of the wavelength-multiplexed optical signal from which the other wavelength-multiplexed optical signal has been demultiplexed.

2. The transmission system according to claim 1, wherein the first node and the second node are the one or more relay nodes.

3. The transmission system according to claim 1, wherein the first node is the transmitting node, and the second node is one of the one or more relay nodes.

4. The transmission system according to claim 1, wherein the first node is one of the one or more relay nodes, and the second node is the receiving node.

5. The transmission system according to claim 1, wherein the first node is the transmitting node, and the second node is the receiving node.

6. The transmission system according to claim 5, wherein the first node includes a first wavelength multiplexing circuit that carries out wavelength multiplexing of another wavelength-multiplexed optical signal in the first wavelength band with the wavelength-multiplexed optical signal in the first wavelength band,
the first wavelength converting circuit and the second wavelength converting circuit convert the wavelength band of the wavelength-multiplexed optical signal with which the wavelength multiplexing of the other wavelength-multiplexed optical signal has been carried out, and
the second node includes a first wavelength demultiplexing circuit that demultiplexes the other wavelength-multiplexed optical signal from the wavelength-multiplexed optical signal.

7. The transmission system according to claim 1, wherein the first node and the second node each include a first amplifying circuit that amplifies the wavelength-multiplexed optical signal in the first wavelength band and a second amplifying circuit that amplifies the wavelength-multiplexed optical signal in the second wavelength band.

8. A transmission system comprising:
a plurality of nodes in which respective adjacent nodes are coupled by a first kind of optical fiber compatible with light in a first wavelength band or a second kind of optical fiber compatible with light in a second wavelength band,
wherein the plurality of nodes includes
a transmitting node that generates a wavelength-multiplexed optical signal in the first wavelength band by carrying out wavelength multiplexing of a plurality of optical signals, and transmits the wavelength-multiplexed optical signal,
a receiving node that demultiplexes the plurality of optical signals from the wavelength-multiplexed optical signal and receives the plurality of optical signals, and
one or more relay nodes that relay the wavelength-multiplexed optical signal from the transmitting node to the receiving node through the first kind or the second kind of optical fiber,
wherein a first node coupled to an adjacent node on a downstream side by the second kind of optical fiber on a most upstream side on a relay path of the wavelength-multiplexed optical signal in the plurality of nodes, includes a first wavelength converting circuit that converts a wavelength band of the wavelength-multiplexed optical signal from the first wavelength band to the second wavelength band,
wherein a second node coupled to an adjacent node on an upstream side by the second kind of optical fiber on a most downstream side on the relay path of the wavelength-multiplexed optical signal in the plurality of nodes, includes a second wavelength converting circuit that converts the wavelength band of the wavelength-multiplexed optical signal from the second wavelength band to the first wavelength band, the first kind of optical fiber is compatible with the light in the first wavelength band and the light in the second wavelength band, and one set of relay nodes that are coupled by the first kind of optical fiber and are adjacent to each other exist between the first node and the second node on a path of the wavelength-multiplexed optical signal.

9. A transmission method comprising:

carrying out transmission by using a plurality of nodes in which respective adjacent nodes are coupled by a first kind of optical fiber compatible with light in a first wavelength band or a second kind of optical fiber compatible with light in a second wavelength band, wherein the plurality of nodes include a transmitting node that generates a wavelength-multiplexed optical signal in the first wavelength band by carrying out wavelength multiplexing of a plurality of optical signals and transmits the wavelength-multiplexed optical signal, a receiving node that demultiplexes the plurality of optical signals from the wavelength-multiplexed optical signal and receives the plurality of optical signals, and one or more relay nodes that relay the wavelength-multiplexed optical signal from the transmitting node to the receiving node through the first kind or the second kind of optical fiber, wherein a first node coupled to an adjacent node on a downstream side by the second kind of optical fiber on a most upstream side on a relay path of the wavelength-multiplexed optical signal in the plurality of nodes converts a wavelength band of the wavelength-multiplexed optical signal from the first wavelength band to the second wavelength band, wherein a second node coupled to an adjacent node on an upstream side by the second kind of optical fiber on a most downstream side on the relay path of the wavelength-multiplexed optical signal in the plurality of nodes converts the wavelength band of the wavelength-multiplexed optical signal from the second wavelength band to the first wavelength band, wherein the first kind of optical fiber is compatible with the light in the first wavelength band and the light in the second wavelength band, and one set of relay nodes that are coupled by the first kind of optical fiber and are adjacent to each other exist between the first node and the second node on a path of the wavelength-multiplexed optical signal.

10. The transmission method according to claim 9, wherein the first node and the second node are each the one or more relay nodes.

11. The transmission method according to claim 9, wherein the first node is the transmitting node, and the second node is one of the one or more relay nodes.

12. The transmission method according to claim 9, wherein the first node is one of the one or more relay nodes, and the second node is the receiving node.

13. The transmission method according to claim 9, wherein the first node is the transmitting node, and the second node is the receiving node.

14. The transmission method according to claim 13, wherein the first node carries out wavelength multiplexing of another wavelength-multiplexed optical signal in the first wavelength band with the wavelength-multiplexed optical signal in the first wavelength band, and converts the wavelength band of the wavelength-multiplexed optical signal with which the wavelength multiplexing of the other wavelength-multiplexed optical signal has been carried out from the first wavelength band to the second wavelength band, and the second node demultiplexes the other wavelength-multiplexed optical signal from the wavelength-multiplexed optical signal.

15. The transmission method according to claim 13, wherein the first node carries out wavelength multiplexing of another wavelength-multiplexed optical signal in the second wavelength band with the wavelength-multiplexed optical signal whose wavelength band has been converted to the second wavelength band, and the second node demultiplexes the other wavelength-multiplexed optical signal from the wavelength-multiplexed optical signal and converts the wavelength band of the wavelength-multiplexed optical signal from which the other wavelength-multiplexed optical signal has been demultiplexed from the second wavelength band to the first wavelength band.

16. The transmission method according to claim 9, wherein the first node and the second node each amplify the wavelength-multiplexed optical signal in the first wavelength band and each amplify the wavelength-multiplexed optical signal in the second wavelength band.

* * * * *